(12) United States Patent
Zhou et al.

(10) Patent No.: US 9,584,044 B2
(45) Date of Patent: Feb. 28, 2017

(54) TECHNOLOGIES FOR CONVERTER TOPOLOGIES

(71) Applicant: SunPower Corporation, San Jose, CA (US)

(72) Inventors: Yan Zhou, Tallahassee, FL (US); Haiyu Zhang, College Station, TX (US)

(73) Assignee: SunPower Corporation, San Jose, CA (US)

( * ) Notice: Subject to any disclaimer, the term of this patent is extended or adjusted under 35 U.S.C. 154(b) by 116 days.

(21) Appl. No.: 14/214,896

(22) Filed: Mar. 15, 2014

(65) Prior Publication Data

US 2014/0268908 A1    Sep. 18, 2014

Related U.S. Application Data

(60) Provisional application No. 61/794,480, filed on Mar. 15, 2013.

(51) Int. Cl.
*H02M 7/5381* (2007.01)
*H02M 7/48* (2007.01)

(52) U.S. Cl.
CPC .. *H02M 7/5381* (2013.01); *H02M 2007/4815* (2013.01); *Y02B 70/1441* (2013.01)

(58) Field of Classification Search
CPC ........ H02M 3/10; H02M 3/145; H02M 3/155; H02M 2001/0048; H02M 2001/0054; H02M 2001/0058; H02M 2001/0067; H02M 2001/007; H02M 2003/1552; H02M 2003/1555; H02M 5/40; H02M 5/42; H02M 5/44; H02M 5/453; H02M 5/458; H02M 5/4585; H02M 7/42; H02M 7/44; H02M 7/48; H02M 7/4807; H02M 7/53;

(Continued)

(56) References Cited

U.S. PATENT DOCUMENTS

| 3,670,230 A | 6/1972 | Rooney et al. |
| 4,114,048 A | 9/1978 | Hull |
| 4,217,633 A | 8/1980 | Evans |

(Continued)

FOREIGN PATENT DOCUMENTS

| CA | 2353422 C | 3/2004 |
| CA | 2655007 A1 | 8/2010 |

(Continued)

OTHER PUBLICATIONS

Nikraz et al., "Digital Control of a Voltage Source Inverter in Photovoltaic Applications," 35th Annual IEEE Power Electronics Specialists Conference, pp. 3266-3271, 2004.

(Continued)

*Primary Examiner* — Timothy J Dole
*Assistant Examiner* — David A. Singh
(74) *Attorney, Agent, or Firm* — Barnes & Thornburg LLP

(57) ABSTRACT

In some embodiments of the disclosed inverter topologies, an inverter may include a full bridge LLC resonant converter, a first boost converter, and a second boost converter. In such embodiments, the first and second boost converters operate in an interleaved manner. In other disclosed embodiments, the inverter may include a half-bridge inverter circuit, a resonant circuit, a capacitor divider circuit, and a transformer.

14 Claims, 15 Drawing Sheets

(58) Field of Classification Search
CPC .... H02M 7/537; H02M 7/538; H02M 7/5381;
H02M 2007/4815; H02M 2007/4818
USPC .......... 363/17, 21.02–21.03, 65, 95, 97, 131
See application file for complete search history.

(56) References Cited

U.S. PATENT DOCUMENTS

| | | | |
|---|---|---|---|
| 4,277,692 A | 7/1981 | Small | |
| 4,287,465 A | 9/1981 | Godard et al. | |
| 4,651,265 A | 3/1987 | Stacey et al. | |
| 4,661,758 A | 4/1987 | Whittaker | |
| 4,707,774 A | 11/1987 | Kajita | |
| 4,709,318 A | 11/1987 | Gephart et al. | |
| 4,719,550 A | 1/1988 | Powell et al. | |
| 4,725,740 A | 2/1988 | Nakata | |
| 5,041,959 A | 8/1991 | Walker | |
| 5,148,043 A | 9/1992 | Hirata et al. | |
| 5,160,851 A | 11/1992 | McAndrews | |
| 5,191,519 A | 3/1993 | Kawakami | |
| 5,309,073 A | 5/1994 | Kaneko et al. | |
| 5,343,380 A | 8/1994 | Champlin | |
| 5,345,375 A | 9/1994 | Mohan | |
| 5,473,528 A | 12/1995 | Hirata | |
| 5,499,178 A | 3/1996 | Mohan | |
| 5,598,326 A | 1/1997 | Liu et al. | |
| 5,668,464 A | 9/1997 | Krein | |
| 5,684,385 A | 11/1997 | Guyonneau et al. | |
| 5,721,481 A | 2/1998 | Narita et al. | |
| 5,745,356 A | 4/1998 | Tassitino | |
| 5,796,182 A | 8/1998 | Martin | |
| 5,801,519 A | 9/1998 | Midya et al. | |
| 5,886,890 A | 3/1999 | Ishida et al. | |
| 5,929,537 A | 7/1999 | Glennon | |
| 5,951,785 A | 9/1999 | Uchihashi et al. | |
| 5,978,236 A | 11/1999 | Faberman et al. | |
| 5,982,645 A | 11/1999 | Levran et al. | |
| 6,046,400 A | 4/2000 | Drummer | |
| 6,046,402 A | 4/2000 | More | |
| 6,064,580 A * | 5/2000 | Watanabe ......... | H02M 3/33592 363/127 |
| 6,111,189 A | 8/2000 | Garvison et al. | |
| 6,154,379 A | 11/2000 | Okita | |
| 6,157,168 A | 12/2000 | Malik | |
| 6,180,868 B1 | 1/2001 | Yoshino et al. | |
| 6,201,180 B1 | 3/2001 | Meyer et al. | |
| 6,201,319 B1 | 3/2001 | Simonelli et al. | |
| 6,225,708 B1 | 5/2001 | Furukawa | |
| 6,268,559 B1 | 7/2001 | Yamawaki | |
| 6,285,572 B1 | 9/2001 | Onizuka et al. | |
| 6,291,764 B1 | 9/2001 | Ishida et al. | |
| 6,311,279 B1 | 10/2001 | Nguyen | |
| 6,356,471 B1 | 3/2002 | Fang | |
| 6,369,461 B1 | 4/2002 | Jungreis et al. | |
| 6,381,157 B2 | 4/2002 | Jensen | |
| 6,445,089 B1 | 9/2002 | Okui | |
| 6,462,507 B2 | 10/2002 | Fisher | |
| 6,489,755 B1 | 12/2002 | Boudreaux et al. | |
| 6,563,234 B2 | 5/2003 | Hasegawa et al. | |
| 6,593,521 B2 | 7/2003 | Kobayashi | |
| 6,605,881 B2 | 8/2003 | Takehara et al. | |
| 6,614,132 B2 | 9/2003 | Hockney et al. | |
| 6,624,533 B1 | 9/2003 | Swanson | |
| 6,650,552 B2 * | 11/2003 | Takagi ............... | H02M 3/33592 323/266 |
| 6,657,321 B2 | 12/2003 | Sinha | |
| 6,700,802 B2 | 3/2004 | Ulinski et al. | |
| 6,713,890 B2 | 3/2004 | Kondo et al. | |
| 6,727,602 B2 | 4/2004 | Olson | |
| 6,750,391 B2 | 6/2004 | Bower et al. | |
| 6,765,315 B2 | 7/2004 | Hammerstrom | |
| 6,770,984 B2 | 8/2004 | Pai | |
| 6,791,024 B2 | 9/2004 | Toyomura | |
| 6,795,322 B2 | 9/2004 | Aihara et al. | |
| 6,838,611 B2 | 1/2005 | Kondo et al. | |
| 6,847,196 B2 | 1/2005 | Garabandic | |
| 6,862,195 B2 * | 3/2005 | Jitaru ................. | H02M 3/3376 363/132 |
| 6,881,509 B2 | 4/2005 | Jungreis | |
| 6,882,063 B2 | 4/2005 | Droppo et al. | |
| 6,897,370 B2 | 5/2005 | Kondo et al. | |
| 6,950,323 B2 | 9/2005 | Achleitner | |
| 7,031,176 B2 | 4/2006 | Kotsopoulos et al. | |
| 7,072,195 B2 | 7/2006 | Xu | |
| 7,091,707 B2 | 8/2006 | Cutler | |
| 7,193,872 B2 | 3/2007 | Siri | |
| 7,233,130 B1 | 6/2007 | Kay | |
| 7,289,341 B2 | 10/2007 | Hesterman | |
| 7,297,866 B2 | 11/2007 | Aschenbrenner | |
| 7,319,313 B2 | 1/2008 | Dickerson et al. | |
| 7,324,361 B2 | 1/2008 | Siri | |
| 7,339,287 B2 | 3/2008 | Jepsen et al. | |
| 7,342,171 B2 | 3/2008 | Khouri et al. | |
| 7,365,998 B2 | 4/2008 | Kumar | |
| 7,387,537 B1 | 6/2008 | Daily et al. | |
| 7,388,348 B2 | 6/2008 | Mattichak | |
| 7,405,494 B2 | 7/2008 | Tassitino, Jr. et al. | |
| 7,420,354 B2 | 9/2008 | Cutler | |
| 7,432,691 B2 | 10/2008 | Cutler | |
| 7,463,500 B2 | 12/2008 | West | |
| 7,502,697 B2 | 3/2009 | Holmquist et al. | |
| 7,521,914 B2 | 4/2009 | Dickerson et al. | |
| 7,531,993 B2 | 5/2009 | Udrea et al. | |
| 7,551,460 B2 | 6/2009 | Lalithambika et al. | |
| 7,577,005 B2 | 8/2009 | Angerer et al. | |
| 7,592,789 B2 | 9/2009 | Jain | |
| 7,609,040 B1 | 10/2009 | Jain | |
| 7,626,834 B2 | 12/2009 | Chisenga et al. | |
| 7,638,899 B2 | 12/2009 | Tracy et al. | |
| 7,646,116 B2 | 1/2010 | Batarseh et al. | |
| 7,660,139 B2 | 2/2010 | Garabandic | |
| 7,667,610 B2 | 2/2010 | Thompson | |
| 7,693,174 B2 | 4/2010 | Ishibashi et al. | |
| 7,710,752 B2 | 5/2010 | West | |
| 7,733,679 B2 | 6/2010 | Luger et al. | |
| 7,746,669 B2 * | 6/2010 | Falk ................... | H02M 3/3372 363/132 |
| 7,768,155 B2 | 8/2010 | Fornage | |
| 7,777,587 B2 | 8/2010 | Stevenson et al. | |
| 7,796,412 B2 | 9/2010 | Fornage | |
| RE41,965 E | 11/2010 | West | |
| 7,839,022 B2 | 11/2010 | Wolfs | |
| 7,855,906 B2 | 12/2010 | Klodowski et al. | |
| RE42,039 E | 1/2011 | West et al. | |
| 7,884,500 B2 | 2/2011 | Kernahan | |
| 7,899,632 B2 | 3/2011 | Fornage et al. | |
| 7,916,505 B2 | 3/2011 | Fornage | |
| 8,076,802 B2 | 12/2011 | Fornage | |
| 8,189,789 B2 | 5/2012 | Coan et al. | |
| 8,435,056 B2 | 5/2013 | Fornage et al. | |
| 8,462,518 B2 | 6/2013 | Marroquin et al. | |
| 8,503,200 B2 | 8/2013 | Chapman et al. | |
| 2001/0043050 A1 | 11/2001 | Fisher | |
| 2002/0017822 A1 | 2/2002 | Umemura et al. | |
| 2002/0186020 A1 | 12/2002 | Kondo et al. | |
| 2002/0196026 A1 | 12/2002 | Kimura et al. | |
| 2004/0128387 A1 | 7/2004 | Chin et al. | |
| 2005/0180175 A1 | 8/2005 | Torrey et al. | |
| 2005/0213272 A1 | 9/2005 | Kobayashi | |
| 2006/0067137 A1 | 3/2006 | Udrea et al. | |
| 2006/0067222 A1 | 3/2006 | Endoh | |
| 2006/0083039 A1 | 4/2006 | Oliveira et al. | |
| 2006/0122857 A1 | 6/2006 | DeCotiis et al. | |
| 2007/0040539 A1 | 2/2007 | Cutler | |
| 2007/0040540 A1 | 2/2007 | Cutler | |
| 2007/0051712 A1 * | 3/2007 | Kooken ............... | B23K 9/095 219/130.1 |
| 2007/0133241 A1 | 6/2007 | Mumtaz et al. | |
| 2007/0221267 A1 | 9/2007 | Fornage | |
| 2007/0295392 A1 | 12/2007 | Cinnamon | |
| 2007/0295393 A1 | 12/2007 | Cinnamon | |
| 2008/0006321 A1 | 1/2008 | Munch et al. | |
| 2008/0055952 A1 | 3/2008 | Chisenga et al. | |
| 2008/0078436 A1 | 4/2008 | Nachamkin et al. | |
| 2008/0106921 A1 | 5/2008 | Dickerson et al. | |

(56) References Cited

U.S. PATENT DOCUMENTS

| | | |
|---|---|---|
| 2008/0183338 A1 | 7/2008 | Kimball et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0073726 A1 | 3/2009 | Babcock |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0167285 A1* | 7/2009 | Huang ............... H02M 3/1582 323/363 |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242011 A1 | 10/2009 | Proisy et al. |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0138771 A1 | 6/2010 | Kumar et al. |
| 2010/0139945 A1 | 6/2010 | Dargatz |
| 2010/0162256 A1 | 6/2010 | Branover et al. |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0195665 A1 | 8/2010 | Jackson |
| 2010/0214808 A1* | 8/2010 | Rodriguez ........... H02M 7/4807 363/37 |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |
| 2010/0326490 A1 | 12/2010 | Tagliareni et al. |
| 2011/0012429 A1 | 1/2011 | Fornage |
| 2011/0019444 A1 | 1/2011 | Dargatz et al. |
| 2011/0026281 A1 | 2/2011 | Chapman et al. |
| 2011/0026282 A1 | 2/2011 | Chapman et al. |
| 2011/0043160 A1 | 2/2011 | Serban |
| 2011/0049990 A1 | 3/2011 | Amaratunga et al. |
| 2011/0051467 A1* | 3/2011 | Nakanishi ............ H02M 3/337 363/21.02 |
| 2011/0051820 A1 | 3/2011 | Fornage |
| 2011/0083733 A1 | 4/2011 | Marroquin et al. |
| 2011/0130889 A1 | 6/2011 | Khajehoddin et al. |
| 2011/0222326 A1 | 9/2011 | Gray et al. |
| 2012/0063177 A1* | 3/2012 | Garrity ................ H02J 3/383 363/37 |
| 2012/0087159 A1 | 4/2012 | Chapman et al. |
| 2012/0089260 A1 | 4/2012 | Krohne et al. |
| 2012/0112547 A1* | 5/2012 | Ghosh ................ H02J 9/062 307/66 |
| 2012/0112702 A1* | 5/2012 | Steigerwald ........ B60L 3/0069 320/137 |
| 2012/0153729 A1* | 6/2012 | Song .................. H02J 7/0013 307/82 |
| 2012/0262953 A1* | 10/2012 | Jungreis ............... H02M 3/285 363/17 |
| 2012/0300502 A1* | 11/2012 | Shimada ............ H02M 1/4258 363/17 |
| 2013/0076135 A1* | 3/2013 | Zhu .................... H02M 3/1584 307/43 |
| 2013/0271926 A1 | 10/2013 | Marroquin et al. |
| 2014/0003110 A1 | 1/2014 | Rothblum et al. |
| 2014/0036563 A1 | 2/2014 | Chapman et al. |
| 2014/0198542 A1* | 7/2014 | Swamy ............... H02M 1/4225 363/37 |

FOREIGN PATENT DOCUMENTS

| | | |
|---|---|---|
| CA | 2693737 A1 | 8/2010 |
| DE | 20012131 U1 | 3/2001 |
| DE | 102004053942 A1 | 5/2006 |
| EP | 0793278 A2 | 9/1997 |
| EP | 1794799 A1 | 6/2007 |
| EP | 1803161 A1 | 7/2007 |
| EP | 1837985 A2 | 9/2007 |
| EP | 2043160 A2 | 4/2009 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | 2004008619 A2 | 1/2004 |
| WO | 2004100348 A1 | 11/2004 |
| WO | 2004100348 A8 | 12/2005 |
| WO | 2006048688 A1 | 5/2006 |
| WO | 2007080429 A2 | 7/2007 |
| WO | 2009081205 A2 | 7/2009 |
| WO | 2009081205 A3 | 10/2009 |
| WO | 2009134756 A1 | 11/2009 |

OTHER PUBLICATIONS

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 30 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

(56) References Cited

OTHER PUBLICATIONS

Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/ SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l. Conf. Power Electronics, vol. 1, pp. 559-564, 1996.

Takahashi et al., "Electrolytic Capacitor-Less PWM Inverter," in Proceedings of the IPEC '90, Tokyo, Japan, pp. 131-138, Apr. 2-6, 1990.

Thomas et al., "Design and Performance of Active Power Filters," IEEE IAS Magazine, 9 pp., 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-552, 2003.

Wu, et al., "Aφ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the PHOTOENERGYTM Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

Kutkut, "PV Energy Conversion and System Integration," Florida Energy Systems Consortium, 2009, 24 pages.

Kwon et al., "High-efficiency Module-integrated Photovoltaic Power Conditioning System," IET Power Electronics, doi:10.1049/iet-pel. 2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-

(56) References Cited

OTHER PUBLICATIONS

Free Current," 2002 IEEE 33rd Annual Power Electronics Specialists Conference, vol. 3, pp. 1518-1522, 2002.
Brekken, "Utility-Connected Power Converter for Maximizing Power Transfer From a Photovoltaic Source," Thesis Submitted to the Faculty of the Graduate School of the University of Minnesota, Jun. 2002, 56 pages.
Bush, "UK Solar Firm Discloses Novel Inverter Topology," ElectronicsWeekly.com. Apr. 2011, last accessed Aug. 30, 2011 at http://www.electronicsweekly.com/Articles/2011/O4/26/50953/UK-solar-firm-discloses-novel-inverter-topology.htm.
Chang et al., "The Impact of Switching Strategies on Power Quality for Integral Cycle Controllers," IEEE Transactions on Power Delivery, vol. 18, No. 3, pp. 1073-1078, Jul. 2003.
Chisenga, "Development of a Low Power Photovoltaic Inverter for Connection to the Utility Grid," PhD Thesis, Fitzwilliam College, Cambridge, 173 pages, 2007.
Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.
Edelmoser, "Improved Solar Inverter With Wide Input Voltage Range," IEEE 10th Mediterranean Conference, MEleCon 2000, vol. 2, pp. 810-813, 2000.
Enphase Energy, "Application Note: Multi-Tenant Design Guidelines," rev. 1, 5 pages, 2008.
Enphase Energy, "Enphase Field Wiring Diagram—M190 & M210 Microinverters—240v, Single Phase," Drawing No. 144-00001, rev. 6, 1 page, 2009.
Enphase Energy, "Enphase Micro-Inverter Technical Data," Doc. No. 142-00004, rev. 2, 2 pages, 2008.
Esram et al., "Comparison of Photovoltaic Array Maximum Power Point Tracking Techniques," IEEE Transactions on Energy Conversion, vol. 22, No. 2, pp. 439-449, Jun. 2007.
Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.
Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.
Hung et al., "Analysis and Implementation of a Delay-compensated Deadbeat Current Controller for Solar Inverters," IEEE Proceedings—Circuits, Devices and Systems, pp. 279-286, 2001.
Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.
Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.
Jeong et al., "An Improved Method for Anti-Islanding by Reactive Power Control," pp. 965-970, 2005.
Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.
Jung et al., "High-frequency DC Link Inverter For Grid-Connected Photovoltaic System," Conference Record of the Twenty-Ninth IEEE Photovoltaic Specialists Conference, pp. 1410-1413, 2002.
Kern, "SunSine300: Manufacture of an AC Photovoltaic Module, Final Report, Phases I & II, Jul. 25, 1995-Jun. 30, 1998," NREL/SR-520-26085, 1999, 32 pages.
Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.
Khajehoddin et al., "A Novel Topology and Control Strategy for Maximum Power Point Trackers and Multi-string Grid-connected PV Inverters," Applied Power Electronics Conference, APEC08, pp. 173-178, 2008.
Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.
Kim et al., "New Control Scheme for AC-DC-AC Converter Without DC Link Electrolytic Capacitor," 24th Annual IEEE Power Electronics Specialists Conference, PESC '93 Record., pp. 300-306, 1993.
Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.
Kern, "Inverter Technology for the Solar Industry," Siemens Energy & Automation, 2009, 20 pages.
Curran, "Grid-Connected Solar Microinverter Reference Design," Microchip Technology Incorporated, 2010, 31 pages.
Ferriera, et al. "Powerline Communications: Theory and Applications for Narrowband and Broadband Communications over Power Lines," Aug. 2010, Chapter 2, 120 pages.
Ferriera, et al. "Powerline Communications: Theory and Applications for Narrowband and Broadband Communications over Power Lines," Aug. 2010, Chapter 4, 48 pages.
Ferriera, et al. "Powerline Communications: Theory and Applications for Narrowband and Broadband Communications over Power Lines," Aug. 2010, Chapter 5, 116 pages.
Hoffner et al., "A PV window awning system on the University of Texas Houston Health Science Center using AC-modules," Conference Record of the Twenty-Eighth IEEE Photovoltaic Specialists Conference, pp. 1545-1547, 2000.
International Search Report and Written Opinion received for PCT Application No. PCT/US2010/052057, mailed on May 12, 2011, 8 pages.
York, Ben, et al., "An Integrated Boost Resonant Converter for Photovoltaic Applications," IEEE Transactions on Power Electronics, vol. 28, No. 3, Mar. 2013, 9 pages.
Park, Seung-Won, et al., "Analysis of Quasi Resonant Current-Fed Two-Inductor Boost Converter for PV-MIC," 8th International Conference on Power Electronics—ECEE Asia, May 30-Jun. 3, 2011, The Shilla Jeju, Korea, 5 pages.
Harikrishnan, et al., "Experimental Investigation of High Step-Up DC-DC Converter for Fuel Cell System," International Journal of Electromagnetics and Applications 2012, 8 pages.
Abdel-Rahman, Sam, "Resonant LLC Converter: Operation and Design," Infineon Technologies North America (IFNA) Corp, Application Note AN Sep. 2012, V1.0, Sep. 2012, 20 pages.
Lazar, James F. et al., "Steady-State Analysis of the LLC Series Resonant Converter," 8 pages.
"AN2644 Application Note, An Introduction to LLC Resonant Half-Bridge Converter," 2008 STMicroelectronics, 64 pages.

* cited by examiner

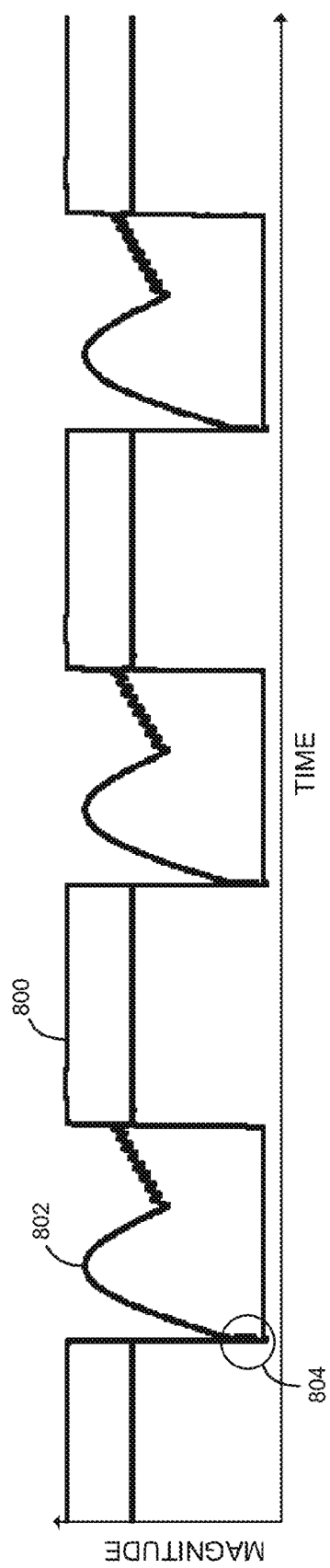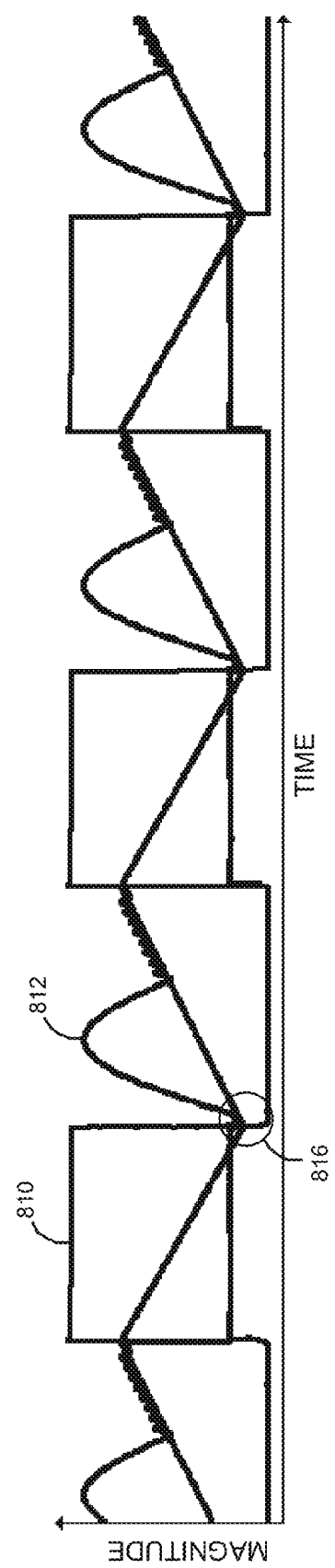

TECHNOLOGIES FOR CONVERTER TOPOLOGIES

CROSS-REFERENCE TO RELATED U.S. PATENT APPLICATION

The present application claims priority under 35 U.S.C. §119(e) to U.S. Provisional Patent Application Ser. No. 61/794,480, entitled "CONVERTER TOPOLOGIES" by Yan Zhou et al., which was filed on Mar. 15, 2013, the entirety of which is hereby incorporated by reference.

GOVERNMENT RIGHTS

This invention was made in part with government support under Grant No. DE-EE0005341 awarded by the Department of Energy. The Government has certain rights in this invention.

TECHNICAL FIELD

The present disclosure relates, generally, to power converters for converting direct current (DC) power to alternating current (AC) power and, more particularly, to boost converter topologies for stepping up DC power.

BACKGROUND

Power inverters convert a DC power to an AC power. For example, some power inverters are configured to convert the DC power to an AC power suitable for supplying energy to an AC grid and, in some cases, an AC load that may or may not be coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency. The amount of power that can be delivered by certain alternative energy sources, such as PV cells, may vary in magnitude over time due to temporal variations in operating conditions. For example, the output of a typical PV cell will vary as a function of variations in sunlight intensity, angle of incidence of sunlight, ambient temperature and other factors.

Such power inverters typically include a DC-DC converter to step up the voltage from a relatively low DC voltage (e.g., 30 V) to a power bus voltage of the inverter (e.g., 400 V). Depending on the particular implementation, the converter may be designed with any one of a number of different topologies. Common topologies include, for example, an isolated boost converter design, a "flyback" converter design, and a "series-LLC" converter design, each of which have distinct operational characteristics and/or components. In particular, the isolated boost converter is a "hard-switched" converter (i.e., the switches and diodes simultaneously experience a high current and high voltage stress during a switching transition) and often includes an active clamp circuit across a switch bridge to absorb mismatched current and limit the voltage. The flyback design is a generally simple converter topology having relatively simple control and gate drive requirements but has significant switch stresses and is an inherently hard-switched design. The series-LLC converter has an inherently soft-switched design and low voltage stresses and typically does not require an active clamp circuit. Unlike isolated boost converters, which are typically current-fed, series-LLC converters are fundamentally voltage-fed; because the input voltage generated by the PV cells may vary significantly over time, series-LLC converters must account for such variation. Accordingly, voltage-fed topologies tend to "step down" the voltage prior to boosting voltage (e.g., via a turns ratio of the transformer), which can result in inefficiency for the converter.

In a typical photovoltaic power system, an inverter may be associated with one or more solar cell panels. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small, relatively low voltage (e.g., 25 V). The inverter may be placed in close proximity to the associated solar cell panel to increase the conversion efficiency of the overall system.

SUMMARY

According to one aspect, an inverter for converting an input direct current (DC) waveform from a DC source to an output alternating current (AC) waveform for delivery to an AC grid may include an input converter electrically coupled to a DC power bus. The input converter may be configured to convert the input DC waveform to a bus waveform supplied to the DC power bus. Additionally, the input converter may include a full bridge resonant converter, a first boost converter coupled to the full bridge resonant converter, and a second boost converter coupled to the full bridge resonant converter. The full bridge resonant converter may include (i) a first pair of electrical switches electrically coupled to each other at a first electrical connection, and (ii) a second pair of electrical switches electrically coupled to each other at a second electrical connection, and (iii) a resonant tank circuit. The first boost converter may include (i) a capacitor, (ii) the first pair of electrical switches, and (iii) a first inductor having a first terminal to receive the input DC waveform and a second terminal electrically coupled to the first connection. The second boost converter may include (i) the capacitor, (ii) the second pair of electrical switches, and (iii) a second inductor having a first terminal electrically coupled to the first terminal of the first inductor to receive the input DC waveform and a second terminal electrically coupled to the second electrical connection.

In some embodiments, the capacitor may include (i) a first terminal electrically coupled to a first switch of the first pair of electrical switches and a first switch of the second pair of electrical switches at a third electrical connection and (ii) a second terminal electrically coupled to a second switch of the first pair of electrical switches and a second switch of the second pair of electrical switches at a fourth electrical connection. Additionally, in some embodiments, the resonant tank circuit may include a resonant capacitor and a resonant inductor electrically coupled in series. In such embodiments, the full bridge resonant converter may further include a transformer and the resonant inductor may include a resonant inductance formed from at least one of a leakage inductance and a magnetizing inductance of the transformer. Additionally or alternatively, in such embodiments, the resonant capacitor may resonate with the leakage inductance and energy may be transferred from the capacitor across the transformer during resonance in response to one of (i) the first switch of the first pair of electrical switches and a first switch of the second pair of electrical switches being active or (ii) a second switch of the first pair of electrical switches and a second switch of the second pair of electrical switches being active.

In some embodiments, each of the first boost converter and the second boost converter may be configured to increase a magnitude of the input DC waveform to generate a boosted DC waveform. Additionally, the first pair and second pair of electrical switches of the full bridge resonant converter may be configured to receive the boosted DC waveform and to generate a square waveform. The resonant tank circuit may be configured to receive the square waveform and to convert the square waveform to a resonant sinusoidal waveform.

Additionally, in some embodiments, the inverter may further include an inverter controller electrically coupled to the input converter and configured to control operation of the first pair and second pair of electrical switches. In such embodiments, the inverter controller may be configured to operate the first pair of electrical switches with a phase shift relative to the second pair of electrical switches for interleaved operation of the first and second boost converters. Additionally, in some embodiments, at least one switch of the first pair of switches or the second pair of switches may be controlled by the inverter controller using zero-voltage switching. Further, in some embodiments, the inverter controller may be configured to control operation of the first pair and second pair of electrical switches using pulse width modulation and duty cycle modifications. Additionally, in some embodiments, at least one of the first boost converter and the second boost converter may be configured to operate at a fixed frequency. In such embodiments, the corresponding pair of electrical switches may be controlled via pulse-width modulation duty cycle control.

In some embodiments, the full bridge resonant converter may further include a transformer. In such embodiments, the inverter may also include a rectifier circuit electrically coupled to a secondary winding of the transformer and to the DC power bus. The rectifier circuit may be configured to convert an input AC waveform received from the secondary winding of the transformer to the bus waveform supplied to the DC power bus. Additionally, in some embodiments, the DC source may be embodied as a photovoltaic power source.

According to another aspect, an input converter of a power inverter for boosting a direct current (DC) waveform from a DC source to supply a DC bus waveform to a power bus may include a half-bridge inverter circuit, a resonant circuit, a capacitor divider circuit, a transformer, and/or a rectifier circuit. The half-bridge inverter circuit may include a first electrical switch electrically coupled to a second electrical switch at a first electrical connection, the half-bridge inverter circuit configured to convert an input DC waveform to an AC waveform. The resonant circuit electrically may be coupled to the half-bridge inverter circuit and may include an output electrically coupled to the first electrical connection to supply the input DC waveform to the half-bridge inverter circuit. The capacitor divider circuit may be electrically coupled to the inverter circuit to receive the AC waveform from the inverter circuit and generate a divided AC voltage signal. The transformer may include a primary winding and a secondary winding. The primary winding of the transformer may include a first terminal electrically connected to the first electrical connection and a second terminal electrically connected to the capacitor divider to receive the divided AC voltage signal therefrom. The rectifier circuit may be electrically coupled to the secondary winding of the transformer and to the power bus.

The rectifier circuit may be configured to convert an input AC waveform received from the secondary winding of the transformer to the DC bus waveform supplied to the power bus.

In some embodiments, the capacitor divider circuit may include a first capacitor electrically coupled to a second capacitor at a second electrical connection. In such embodiments, each of the first capacitor and second capacitor may have a first terminal electrically coupled to the second electrical connection. Additionally, the first electrical switch may include a first terminal electrically coupled to the first electrical connection and a second terminal electrically coupled to a second terminal of the first capacitor. Similarly, the second electrical switch may include a first terminal electrically coupled to the first electrical connection and a second terminal electrically coupled to a second terminal of the second capacitor.

Additionally, in some embodiments, the second terminal of the transformer is electrically coupled to the second electrical connection. In some embodiments, at least one of the first electrical switch or the second electrical switch may be configured to be controlled in a zero-voltage switching mode. Additionally, in some embodiments, the rectifier circuit may include a plurality of diodes and at least one diode of the plurality of diodes is configured to be controlled by soft switching and with negligible reverse recovery. Further, in some embodiments, the DC source may be embodied as a photovoltaic power source.

BRIEF DESCRIPTION OF THE DRAWINGS

FIGS. 8A-8D illustrate simulated waveforms of various circuits of the input converter of FIGS. 5-7;

DETAILED DESCRIPTION

Figure 1:
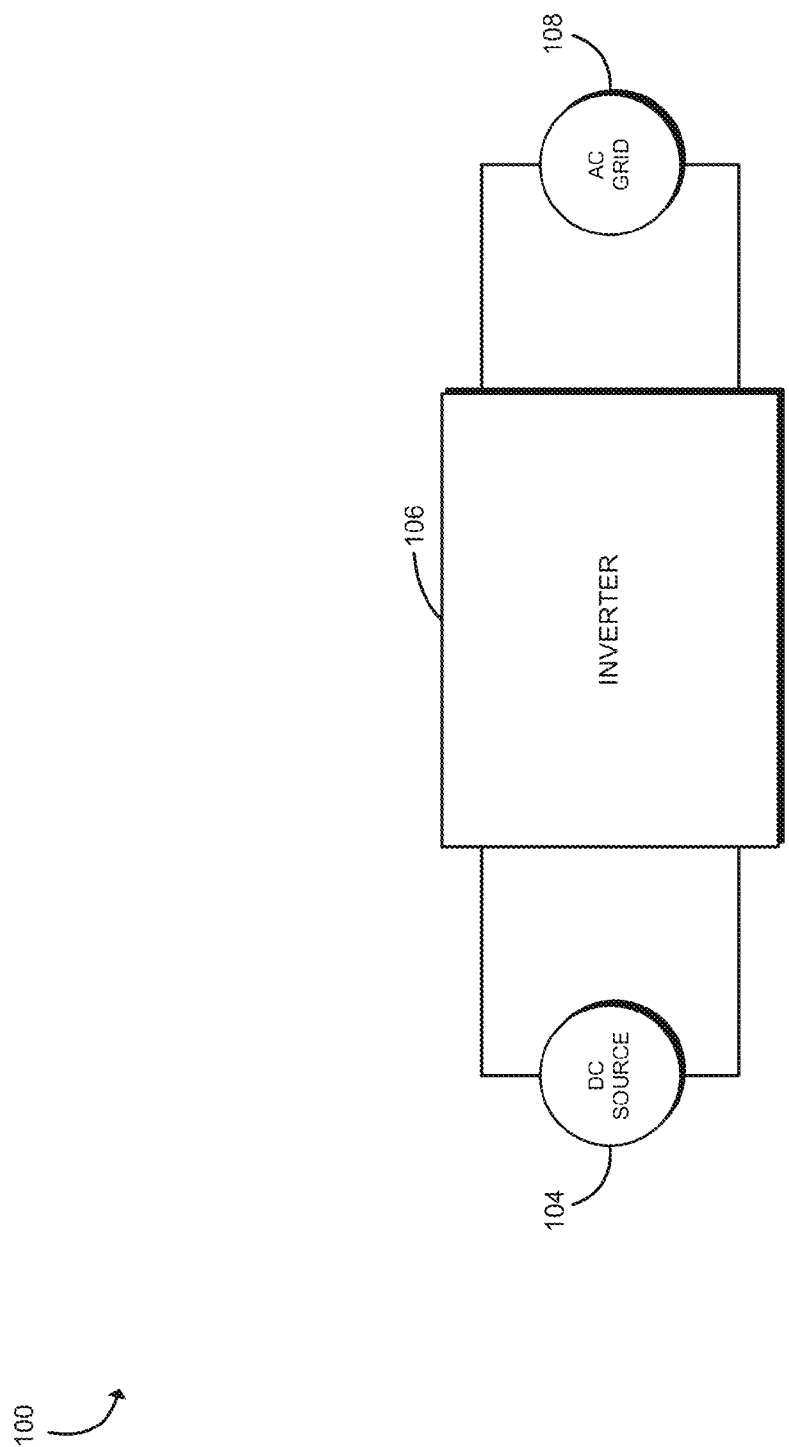
FIG. 1 is a simplified block diagram of one embodiment of a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC power may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e.g., f=ω/2π=50 Hz or 60 Hz).

Figure 2:
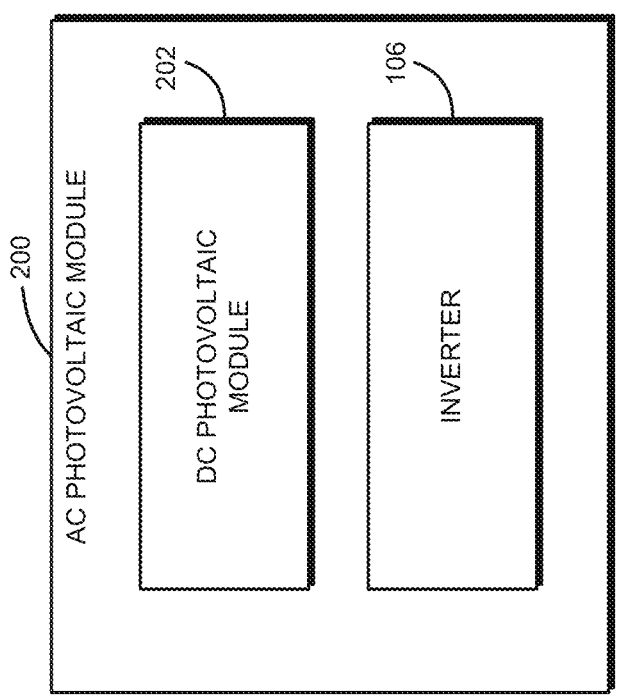
FIG. 2 is a simplified block diagram of one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other to embody an AC photovoltaic module (ACPV) 200 as illustrated in FIG. 2. The ACPV 200 includes a DC photovoltaic module (DCPV) 202, which operates as the DC source 104, electrically coupled to the inverter 106. The DCPV 202 includes one or more photovoltaic cells and is configured to deliver a DC waveform to the inverter 106 in response to receiving an amount of sunlight. The DC power delivered by the ACPV 200 is a function of environmental variables, such as, e.g., sunlight intensity, sunlight angle of incidence and temperature. In some embodiments, the inverter 106 is positioned in a housing of the ACPV 200. Alternatively, the inverter 106 may include its own housing secured to the housing of the ACPV 200. Additionally, in some embodiments, the inverter 106 is separate from the housing, but located near the DCPV 202. As discussed above, the inverter 106 is configured to convert the DC power received from the DCPV 202 to an AC power suitable for delivery to the AC grid 102 at the grid frequency. It should be appreciated that multiple ACPVs 200 may be used to form a solar array with each ACPV 200 having a dedicated inverter 106.

Figure 3:
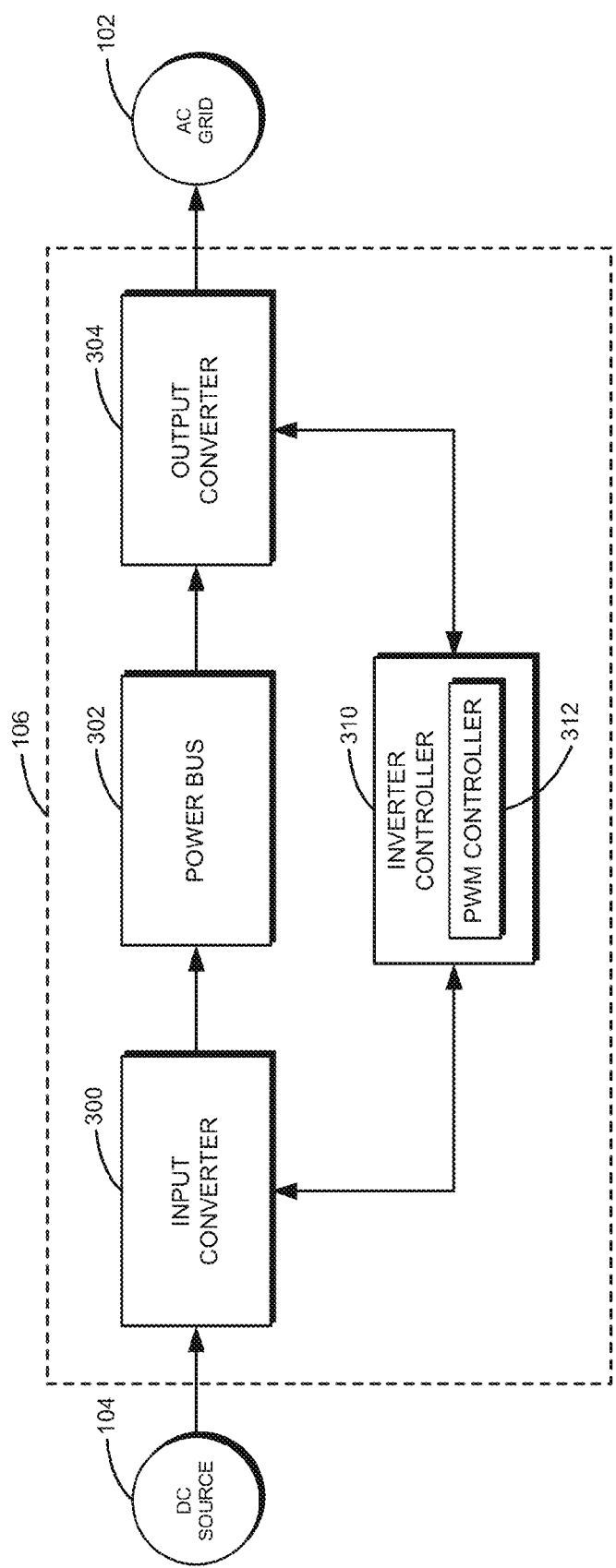
FIG. 3 is a simplified block diagram of one embodiment of an inverter of the system of FIG. 1.

Referring now to FIG. 3, in one embodiment, the inverter 106 includes an input converter 300, a power bus 302, and an output converter 304. The input converter 300 is electrically coupled to the power bus 302 and is electrically couplable to the DC source 104 as shown in FIG. 3. Similarly, the output converter 304 is electrically coupled to the power bus 302 and electrically couplable to the AC grid 102. The inverter 106 also includes an inverter controller 310, which controls the operation of the input converter 300 and the output converter 304. Although the inverter controller 310 is shown as a single controller in the embodiment of FIG. 3, the inverter controller 310 may be embodied as two separate controllers in some embodiments. That is, in some embodiments, the inverter 106 may include an input controller to control the operation of the input converter 300 and an output controller, separate from the input controller (e.g., galvanically isolated from the input controller), to control the operation of the output converter 304.

In use, the input converter 300 of the inverter 106 is configured for electrically coupling to the DC source 104 to receive a DC waveform therefrom. The input converter 300 converts the DC waveform to a bus waveform, which in the illustrative embodiment is embodied as a DC waveform. Similarly, the output converter 304 is configured to be electrically coupled to the AC grid 102 and convert the bus waveform (i.e., either a DC waveform or an AC waveform) to the output AC waveform at the grid frequency for delivery to the AC grid 102.

As discussed above, the inverter controller 310 is electrically coupled to the input converter 300 and configured to control the operation of the input converter 300 to convert the input DC waveform from the DC source 104 to the bus waveform (e.g., a DC bus waveform) at the power bus 302. To do so, the inverter controller 310 may provide a plurality of switching and/or control signals to various circuits of the input converter 300. For example, in some embodiments, the inverter controller 310 controls the operation of the input converter 300 based on a global maximum power point tracking ("MPPT") method. Illustratively, the inverter controller 310 is also electrically coupled to the output converter 304 and configured to control the operation of the output converter 304 to convert the bus waveform to the output AC waveform suitable for delivery to the AC grid 102. As shown in FIG. 3, the illustrative inverter controller 310 includes a pulse width modulation ("PWM") controller 312 that utilizes a PWM algorithm to control various switches of the inverter 106 as described in greater detail below. To do so, the PWM controller 312 may provide a plurality of switching and/or control signals to various circuits of the inverter 106.

Additionally, in some embodiments, the inverter 106 may include circuits not shown herein for clarity of the description. For example, the inverter 106 may include communication circuitry, which may be communicatively coupled to the inverter controller 310 or may be incorporated therein. In such embodiments, the inverter controller 310 may utilize the communication circuitry to communicate with remote devices, such as remote controllers or servers. For example, depending on the particular embodiment, the communication circuitry may be configured to communicate with remote devices over an AC power line, such as the AC power line interconnects coupled to the output of the output converter 304, or using other communication technologies and/or protocols. For example, in some embodiments, the communication circuitry may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

Figure 4:
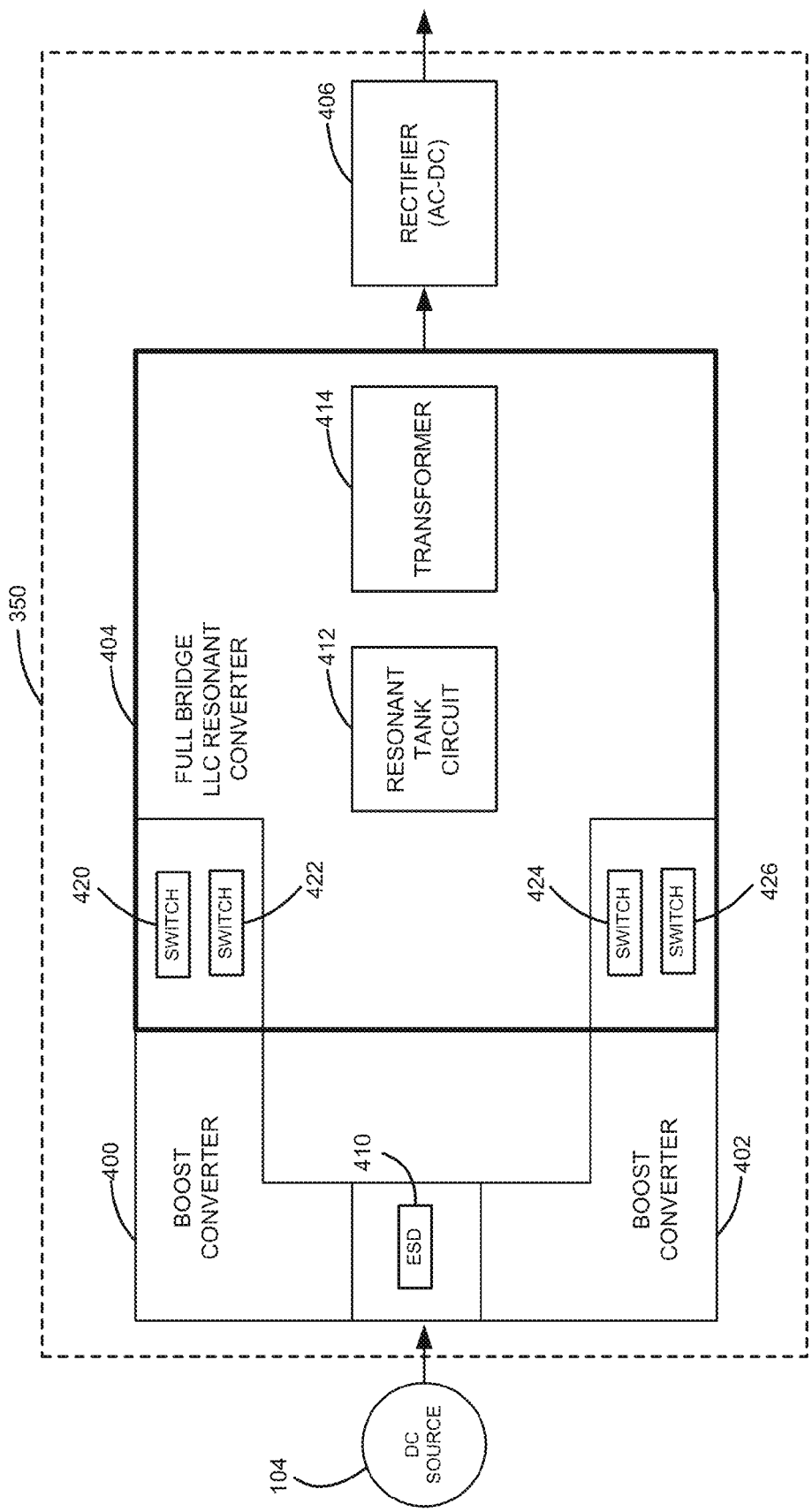
FIG. 4 is a simplified block diagram of one embodiment of an input converter of the inverter of FIG. 3.

Referring now to FIG. 4, in an illustrative embodiment, the input converter 300 is embodied as a DC-to-DC input converter 350. The illustrative input converter 350 includes two boost converters 400, 402, a full bridge LLC resonant converter 404, and a rectifier 406. Each of the boost converters 400, 402 is embodied as a DC-to-DC power converter configured to boost or "step up" the voltage (i.e., generate an output voltage greater than its input voltage). The boost converters 400, 402 are electrically coupled to the full bridge LLC resonant converter 404 and configured for electrical coupling to the DC source 104.

As shown in FIG. 4, the boost converter 400 includes an energy storage device (ESD) 410 and pair of electrical switches 420, 422. Similarly, the boost converter 402 includes the energy storage device 410 and a pair of switches 424, 426. As such, it should be appreciated that the boost converters 400, 402 share a common energy storage device 410, and they are therefore also coupled to one another. Additionally, as shown in the illustrative embodiment, the full bridge LLC resonant converter 404 includes a resonant tank circuit 412, a transformer 414, and the switches 420, 422, 424, 426. Again, it should be appreciated that the full bridge LLC resonant converter 404 share common switches 420, 422 with the boost converter 400 and common switches 424, 426 with the boost converter 402, and is therefore coupled to the boost converters 400, 402.

Figure 5:
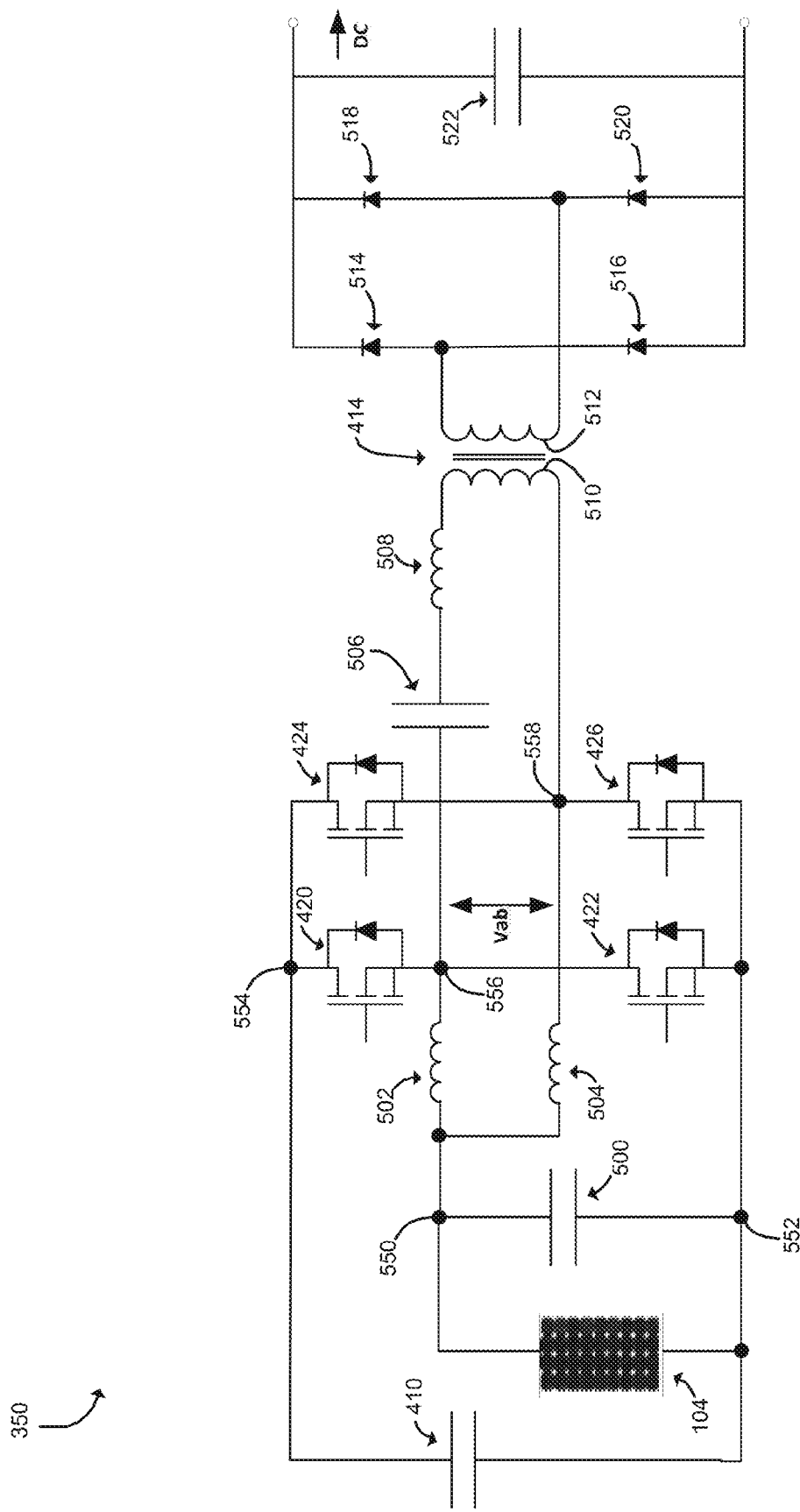
FIGS. 5-7 are simplified electrical schematics of one embodiment of the input converter of FIG. 4 having an illustrative circuit topology.
Figure 6:
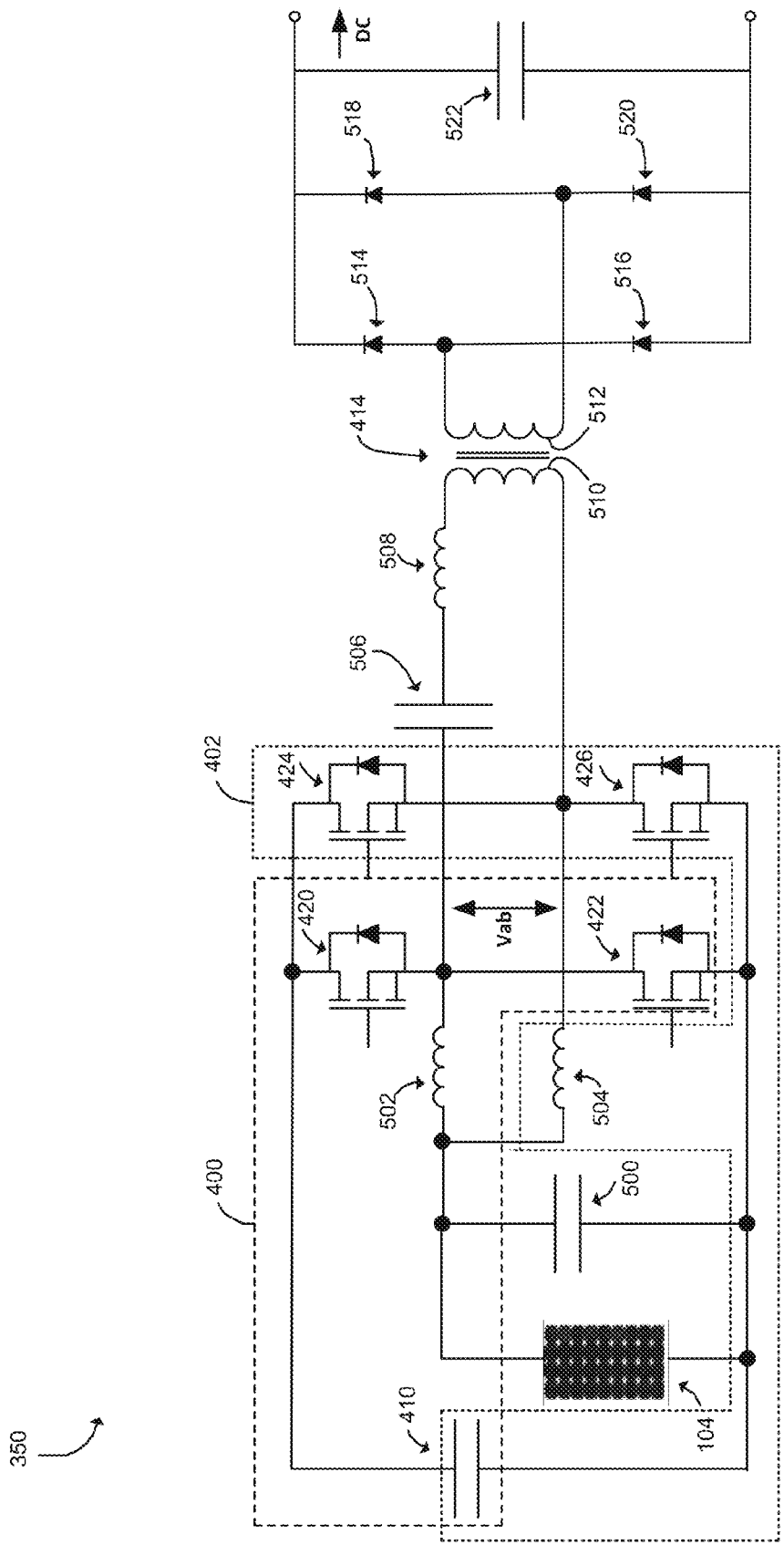
Figure 7:
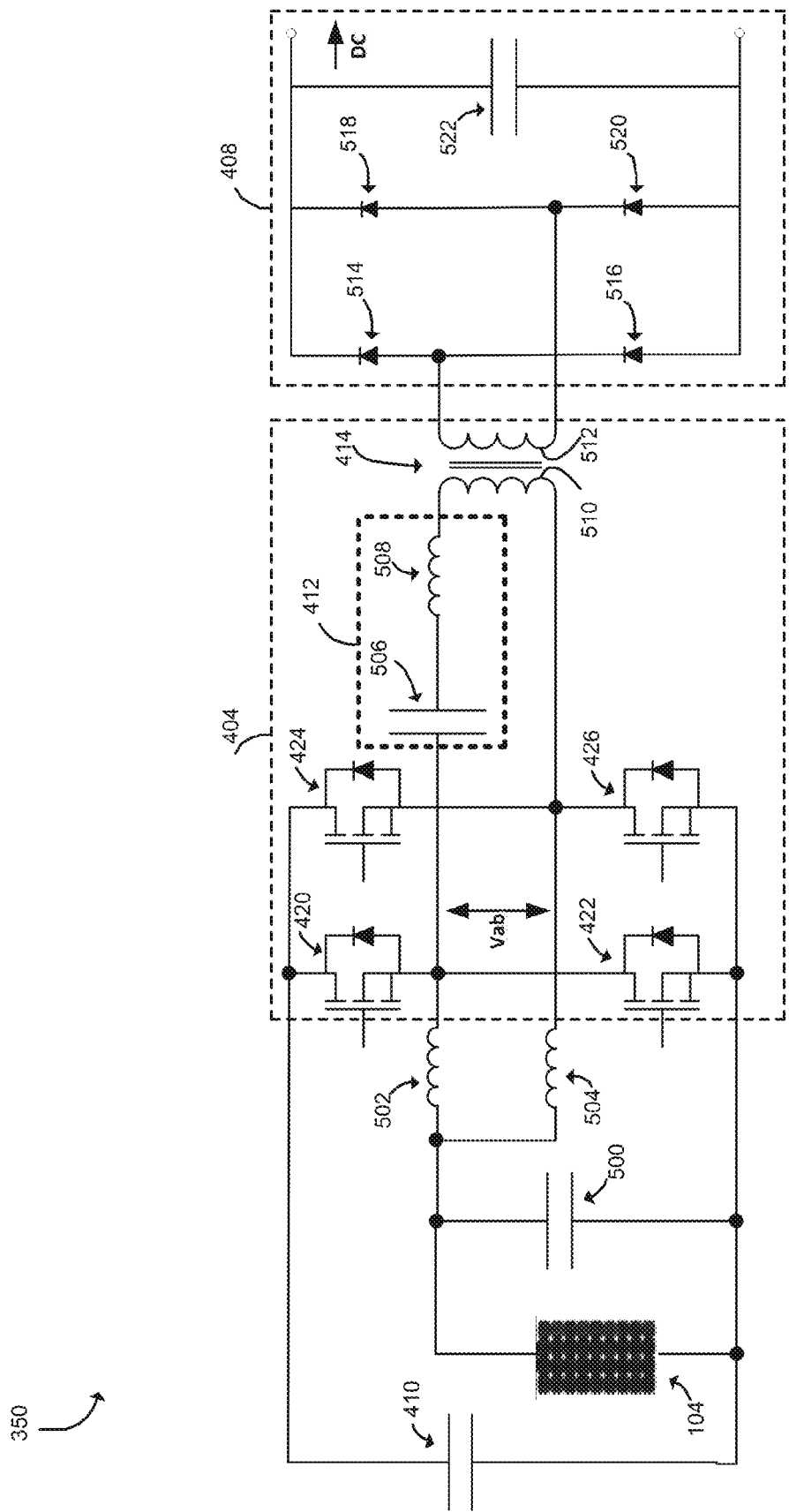

The full bridge LLC resonant converter 404 is illustratively embodied as a DC-to-AC inverter circuit configured to convert the DC waveform supplied by the DC source 104 to an AC waveform delivered to the rectifier 406. In particular, the full bridge LLC resonant converter 404 utilizes the switches 420, 422, 424, 426, which may be controlled by the inverter controller 310, to generate a square waveform having a voltage, $V_{ab}$, as shown in FIGS. 5-7. The full bridge LLC resonant converter 404 converts the square waveform into a resonant sinusoidal current waveform by virtue of the resonant tank circuit 412. As discussed below, the resonant tank circuit 412 may include, or otherwise be configured based on, a component of the transformer 414 (e.g., the leakage inductance and/or magnetizing inductance of the transformer 414). It should be appreciated that the resonant sinusoidal waveform generated by the resonant tank circuit 412, and other sinusoidal waveforms discussed herein, may be embodied as sinusoidal or sinusoidal-like waveforms. That is, a sinusoidal waveform may be embodied as a "pure" sinusoidal waveform or otherwise include some amount of distortion, offset, or other waveform imperfections due to dead time, nonlinearity of the transformer 414, and/or other circuit parameters and/or operational characteristics.

The transformer 414 may be embodied as a two or more winding transformer having a primary winding electrically coupled to, or otherwise forming a portion of, the resonant tank circuit 412 of the full bridge LLC resonant converter 404 and a secondary winding coupled to the rectifier 406. The transformer 414 is configured to convert an input AC waveform at the primary winding to a second AC waveform at the secondary winding. The first and second AC waveforms may have substantially equal frequency and may or may not have substantially equal voltages. The rectifier 406 is electrically coupled to the secondary winding of the transformer 414 and configured to rectify the second AC waveform to a DC waveform supplied to the power bus 302. Of course, it should be appreciated that an input converter 300 having other circuit topology and/or additional or fewer modules may be used in other embodiments.

An embodiment of the input converter 350 is illustrated in FIGS. 5-7. The illustrative input converter 350 is electrically coupled to the DC source 104, which is embodied as a photovoltaic cell, at electrical connections 550, 552. In particular, a filter capacitor 500 and inductors 502, 504 are electrically coupled to the DC source 104 at the electrical connection 550. The energy storage device 410 is illustratively embodied as a capacitor, and the capacitors 410, 500 and switches 422, 426 (i.e., switches of a bridge circuit formed by the plurality of switches 420, 422, 424, 426) are also electrically coupled to the DC source 104 at the electrical connection 552. The capacitor 410 is further electrically coupled to the switches 420, 424 at an electrical connection 554. Although each of the switches 420, 422, 424, 426 is illustrated as MOSFET devices, other types of switches may be used in other embodiments.

The inductor 502 is electrically coupled to the switches 420, 422 at an electrical connection 556, and the inductor 504 is electrically coupled to the switches 424, 426 at an electrical connection 558. As indicated above, each of the switches 420, 422, 424, 426 is configured to receive a corresponding control signal from the inverter controller 310 to control operation of the inverter 106. The control circuit may use PWM to control the switches 420, 422, 424, 426 at a relatively high switching frequency (e.g., at a frequency that is substantially higher than the AC grid frequency). As shown, a resonant capacitor 506 is electrically coupled in series between the electrical connection 556 and a resonant inductance 508. The resonant inductance 508 may be embodied as, or otherwise include, a physical inductor and/or represent the leakage inductance and/or magnetizing inductance of the transformer 414, an inductance associated with one or more discrete inductors, and/or the inductance of a circuit path (e.g., circuit board traces).

The illustrative transformer 414 includes a primary winding 510 electrically coupled to the resonant inductance 508 and the electrical connection 558 and a secondary winding 512 electrically coupled to the rectifier circuit 408 (see FIG. 7). The transformer 414 provides galvanic isolation between the primary side converter circuitry (including the DC source 104) and the secondary side circuitry (including the power bus 302). The turns ratio of the transformer 414 may also provide voltage and current transformation between the first AC waveform at the primary winding 510 and the second AC waveform at the secondary winding 512. As shown, the rectifier circuit 408 is embodied as a full-bridge rectifier formed from a plurality of diodes 514, 516, 518, 520 and also includes a bus capacitor 522, or other energy storage device, for filtering the DC bus waveform. Of course, in other embodiments, other circuit topologies may be used in the rectifier circuit 408.

It should be appreciated that, in the illustrative embodiment, the boost converter 400 includes the capacitor 410, the inductor 502, and the switches 420, 422 and the boost converter 402 includes the capacitor 410, the inductor 504, and the switches 424, 426 as shown in FIG. 6 via separate dashed boundary lines. Additionally, as shown in FIG. 7, the full bridge LLC resonant converter 404 includes the resonant tank circuit 412 (i.e., the resonant capacitor 506 and the resonant inductance 508), the transformer 414, and the bridge circuit formed by the switches 420, 422, 424, 426. As such, it should be appreciated that the boost converters 400, 402 collectively form an interleaved boost converter.

During operation of the converter 350, the switches 420, 422 and the switches 424, 426 are controlled by the inverter controller 310 to operate with a phase shift relative to one another, which permits the boost converters 400, 402 to operate in an interleaved manner. For example, in an illustrative embodiment, the pair of switches 420, 422 and the pair of switches 424, 426 operate with a 180 degree phase shift relative to one another. It should be appreciated that the illustrative boost converters 400, 402 have PWM-based duty cycle control rather than frequency-based control common to most resonant converters. As such, in some embodiments, the inverter controller 310 may operate the boost converters 400, 402 at a fixed frequency. However, in other embodiments, the inverter controller 310 may control the boost converters 400, 402 via PWM at a variable frequency for various design considerations other than power control (e.g., to optimize/improve efficiency and/or mitigate electromagnetic interference). It should be appreciated, however, that in such embodiments the voltage and/or power control of the boost converters 400, 402 is accomplished via duty cycle control, not by the variation of the frequency of the boost converters 400, 402. The boost converters 400, 402 "feed" voltage across the capacitor 410, which in turn feeds the full bridge LLC resonant converter 404. In particular, the capacitor 410 regulates the voltage across the bridge consisting of the switches 420, 422, 424, 426 to maintain a relatively stable DC voltage without voltage transients, which can damage the switches 420, 422, 424, 426. At the start of the interval during which the diagonal switches 420, 422, 424, 426 are on (i.e., the pair of switches 420, 426 or switches 422, 424), the resonant capacitor 506 resonates with the resonant inductance 508 and energy is transferred from the capacitor 410 to the secondary side of the transformer 414 during the resonation.

As indicated above, the full bridge LLC resonant converter 404 outputs a "smooth" sinusoidal wave rather than a square wave, which eliminates the need for an active voltage clamp and permits "soft" switching. That is, the switches 420, 422, 424, 426 may be controlled using zero-voltage switching or conditional zero-voltage switching (i.e., operation in a critical conduction mode in which there is no or otherwise minimal reverse recovery for the switches 420, 422, 424, 426. In other words, the diodes 514, 516, 518, 520 turn off "softly" so that the corresponding reverse recovery effects from such switching are negligible or otherwise less severe than would be present in response to hard switching. For that reason, the diodes 514, 516, 518, 520 may be embodied as fast recovery diodes (e.g., P-i-N diodes and other conventional diodes) rather than as Schottky diodes (e.g., silicon carbide (SiC) diodes) and other diodes designed to have negligible reverse recovery effects. Of course, each of the diodes 514, 516, 518, 520 may be embodied as any suitable diode depending on the particular implementation.

At the end of the interval during which the energy is transferred across the transformer 414, the high-voltage side diodes 514, 518 turn off naturally (i.e., the turn-off is "soft"). The low-voltage side switches 422, 426 turn off their channels and can utilize zero-voltage switching. During the "dead time" in which all of the switches 420, 422, 424, 426 are off, the inductor current flows through the body diode of the high-side switches 420, 424. The switches 422, 426 utilize zero-voltage switching during turn-on In order for the switches 420, 424 to avoid turning off their corresponding body diodes (i.e., to avoid reverse recovery), critical conduction mode is necessary for the inductors 502, 504. An illustrative condition for critical conduction mode is that $$\Delta i = \frac{V_i D_2}{fL} = 2 i_{dc}$$

where $$D_2 = 1 - \frac{NV_i}{V_{bus}},$$

$V_i$ is the input voltage, $D_2$ is the duty cycle of the corresponding switch, $V_{bus}$ is the voltage across the power bus 302, f is the frequency, L is the inductance of the corresponding inductor 502, 504, and $i_{dc}$ is the current supplied to the power bus 302.

Figure 8C:
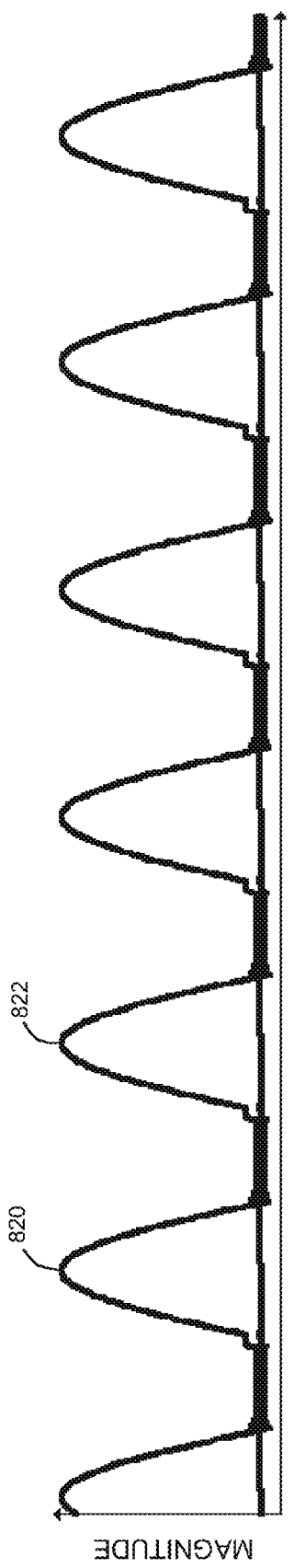

Referring now to FIGS. 8A-8D, simulated waveforms illustrating various operational characteristics of the input converter 350 are shown. In particular, FIG. 8A illustrates a voltage 800 (i.e., a drain to source voltage) across the switch 420 and a current 802 flowing through the switch 420 over time. As shown at point 804 and described above, the switch 420 engages in zero-voltage switching. That is, the switch 420 is turned on when the voltage 800 across the switch 420 is zero or substantially near zero. FIG. 8B illustrates a voltage 810 across the switch 422, a current 812 flowing through the switch 422, and an input current 814 of the corresponding inductor 502 over time. As shown at point 816, the switch 422 also utilizes zero voltage switching. As shown, FIG. 8C illustrates a current 820 flowing through the output diode 514 and a current 822 flowing through the output diode 516. It should be appreciated that the current 820, 822 waveforms through the diodes 514, 516 are approximately half-sinusoidal waves. Additionally, as discussed above, the current 820, 822 of the corresponding diode 514, 516 reaches zero such that the diode 514, 516 can shut itself off rather than being forcibly shut off when not conducting zero current.

Figure 8D:
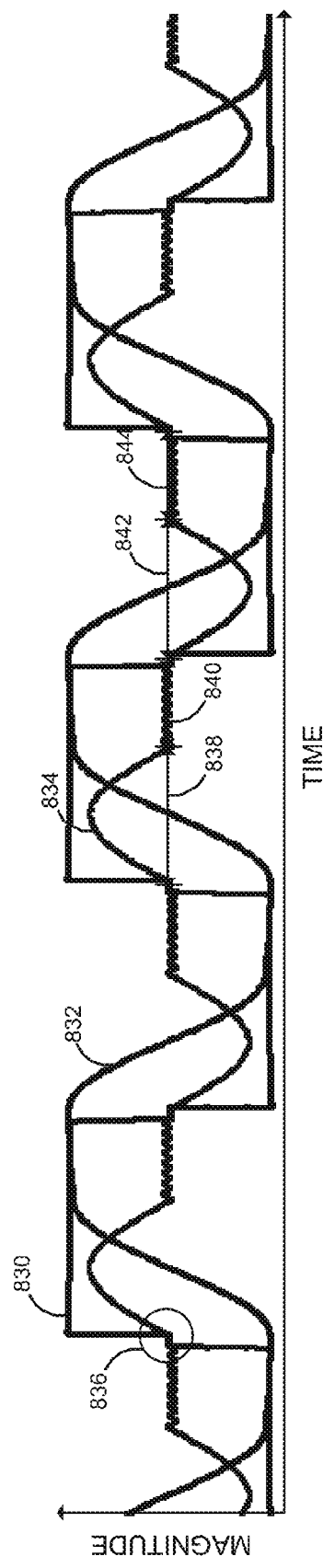

FIG. 8D illustrates waveforms of the resonant tank circuit 412. In particular, FIG. 8D illustrates a voltage 830 (shown as $V_{ab}$ in FIGS. 5-7) generated by the bridge formed from the switches 420, 422, 424, 426, a voltage 832 across the resonant capacitor 506, and a resonant current 834 (e.g., the current flowing through the resonant inductance 508). As shown by the illustrative waveform, the voltage 830 is a tri-level square wave, which has a brief period 836 of zero voltage that corresponds with the dead time in which all of the switches 420, 422, 424, 426 are turned off. Additionally, the inductor current 834 (i.e., the resonant current) is embodied as a half-sinusoidal wave for a period 838, a period 840 of zero current, a negative half-sinusoidal wave for a period 842, and another period 844 of zero current.

It should be appreciated that, in the illustrative embodiment, energy is transferred to the secondary side of the transformer 414 during the positive and negative voltage-level periods. The duration, $t_{active}$, of each positive and negative voltage-level period may be determined according to $$t_{active} = \begin{cases} (1-D_2)T_{sw} & \text{when } D_2 \geq 0.5 \\ D_2 T_{sw} & \text{when } D_2 < 0.5 \end{cases}.$$

Figure 9:
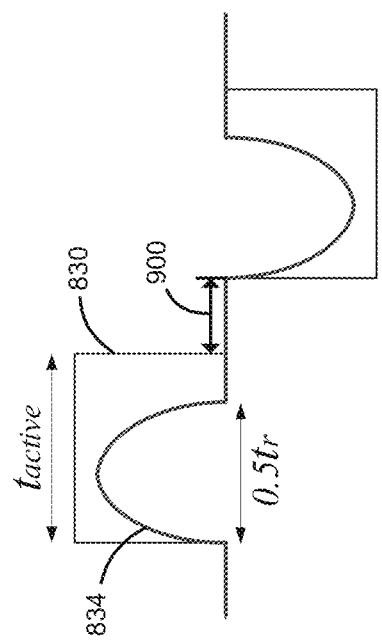
FIG. 9 illustrates a model waveform of a resonant tank circuit of the input converter of FIGS. 5-7.

In order to achieve soft switching of the output diodes 514, 516, 518, 520, half of the LC resonant period should be less than $t_{active}$. In other words, the resonant period should satisfy the condition, $0.5t_r \leq t_{active}$. As shown in FIG. 9, when that condition is satisfied, the resonant current 834 drops to zero prior to the step change of the input voltage 830 for a dead time 900. For that reason, unlike traditional resonant converters, there will be little or no circulating energy in the resonant tank circuit 412 of the input converter 350. In the illustrative embodiment, the condition, $0.5t_r = t_{active}$, is satisfied by the converter 350.

Figure 10:
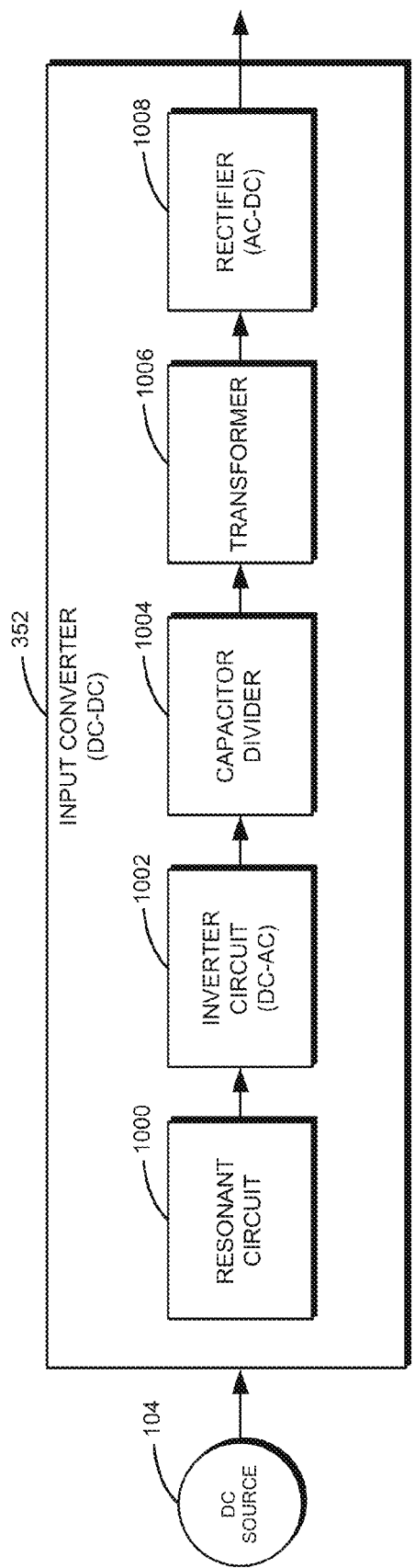
FIG. 10 is a simplified block diagram of another embodiment of an input converter of the inverter of FIG. 3.

Referring now to FIG. 10, in another illustrative embodiment, the input converter 300 is embodied as a DC-to-DC input converter 352. The illustrative input converter 352 includes a resonant circuit 1000, an inverter circuit 1002, a capacitor divider 1004, a transformer 1006, and a rectifier circuit 1008. The resonant circuit 1000 is illustratively embodied as an LC tank circuit and is electrically coupled to the inverter circuit 1002 and configured for electrical coupling to the DC source 104. In some embodiments, when coupled to the DC source 104, the resonant circuit 1000 and the DC source 104 function similar to, and may be treated as, an "ideal" current source for purposes of analysis. The inverter circuit 1002 is embodied as a DC-to-AC inverter circuit configured to convert the DC waveform supplied by the DC source 104 to an AC waveform delivered to the capacitor divider 1004, which generates a divided voltage that is supplied to a primary winding of the transformer 1006. The transformer 1006 may be embodied as a two or more winding transformer having a primary winding electrically coupled to the capacitor divider 1004 and the inverter circuit 1002. The transformer 1006 is configured to convert the first AC waveform supplied by the capacitor divider 1004 at the primary winding to a second AC waveform at the secondary winding. The first and second AC waveforms may have substantially equal frequency and may or may not have substantially equal voltages. The rectifier circuit 1008 is electrically coupled to the secondary winding of the transformer 1006 and configured to rectify the second AC waveform to a DC waveform supplied to the power bus 302.

Figure 11:
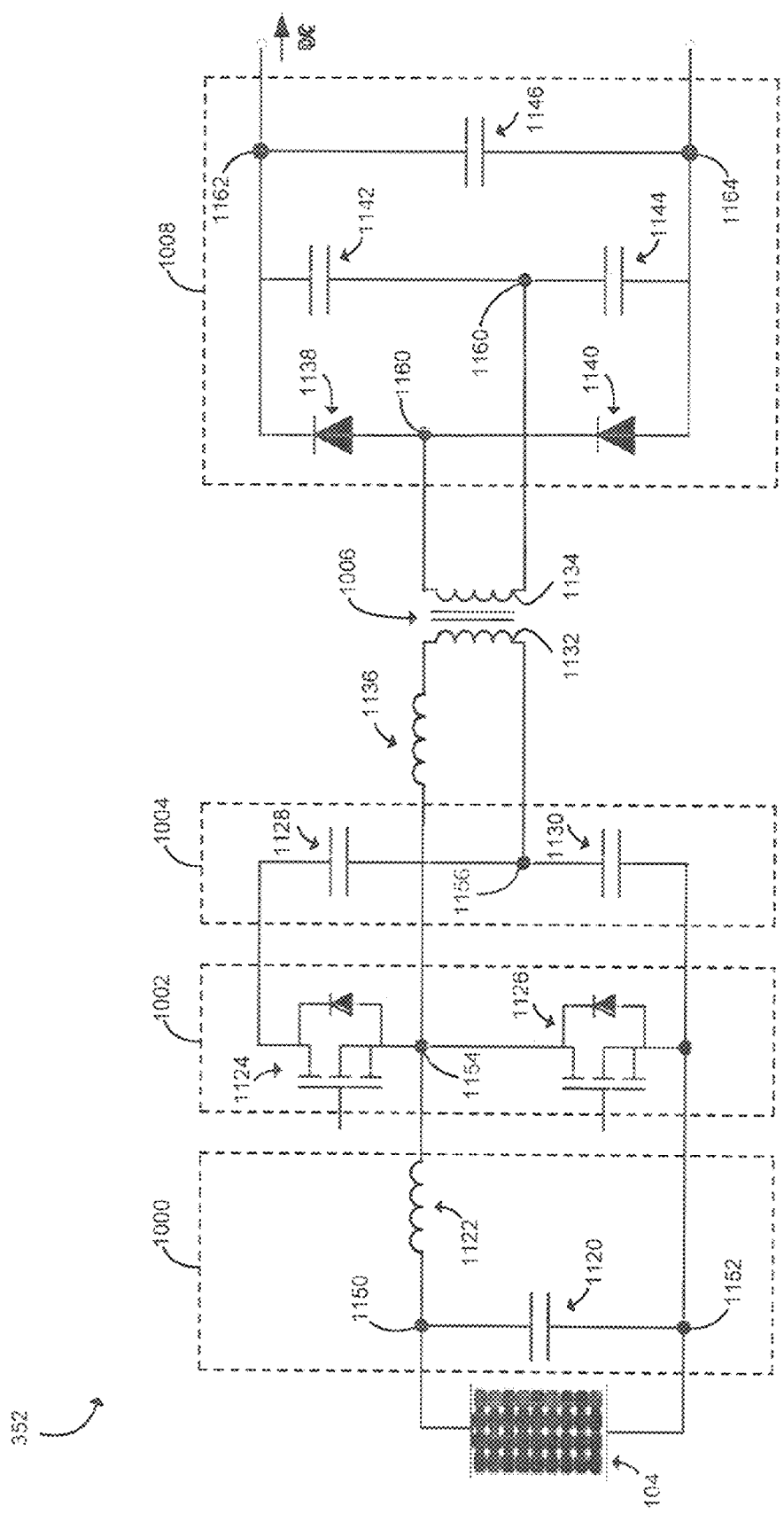
FIG. 11 is a simplified electrical schematic of one embodiment of the input converter FIG. 10 having an illustrative circuit topology.

An illustrative embodiment of the input converter 352 is illustrated in FIG. 11. As shown, the input converter 352 is electrically coupled to the DC source 104, embodied as a photovoltaic cell, via the resonant circuit 1000. In the illustrative embodiment, the resonant circuit 1000 is embodied as an LC circuit including an input capacitor 1120 and an input inductor 1122. The inverter circuit 1002 is illustratively embodied as a half-bridge circuit formed by a plurality of switches 1124, 1126. In other embodiments, the inverter circuit 1002 may include a different number of switches and/or be otherwise embodied as a full-bridge circuit. As indicated above, each of the switches 1124, 1126 is configured to receive a corresponding control signal from the inverter controller 310 to control operation of the inverter 106. For example, the PWM controller 312 of the inverter controller 310 may use PWM to control the switches 1124, 1126 at a relatively high switching frequency (e.g., at a frequency that is substantially higher than the AC grid frequency). The inverter circuit 1002 converts the DC waveform from the DC source 104 or, more particularly, from the resonant circuit 1000 to a first AC waveform based on the control signals received from the inverter controller 310 as discussed above. Additionally, although each of the switches 1124, 1126 is illustrated as MOSFET devices, other types of switches may be used in other embodiments.

The capacitor divider 1004 is electrically coupled to each of the transformer 1006 and the inverter circuit 1002. In the illustrative embodiment, the capacitor divider 1004 includes capacitors 1128, 1130 and is configured to generate a divided voltage. The transformer 1006 includes a primary winding 1132 electrically coupled to the capacitor divider 1004 and the inverter circuit 1002 and a secondary winding 1134 electrically coupled to the rectifier circuit 1008. As shown, the transformer 1006 includes a leakage inductance, which is represented in FIG. 11 by a resonant inductance 1136 electrically coupled to the primary winding 1132 of the transformer 1006. Of course, as indicated above, the resonant inductance 1136 may be embodied as, or otherwise include, as a physical inductor and/or represent the leakage inductance and/or magnetizing inductance of the transformer 1006, an inductance associated with one or more discrete inductors, and/or the inductance of a circuit path (e.g., circuit board traces). The transformer 1006 provides galvanic isolation between the primary side converter circuitry (including DC source 104) and the secondary side circuitry (including power bus 302). The turns ratio of the transformer 1006 may also provide voltage and current transformation between the first AC waveform at the primary winding 1132 and the second AC waveform at the secondary winding 1134.

More specifically, in the illustrative embodiment of FIG. 11, the input converter 352 is electrically coupled to the DC source 104 at electrical connections 1150, 1152. That is, the input capacitor 1120 and the input inductor 1122 are electrically coupled to the DC source 104 at the electrical connection 1150. The capacitors 1120, 1130 and the switch 1126 are electrically coupled to the DC source 104 at the electrical connection 1152. In the illustrative embodiment, the switches 1124, 1126 are electrically coupled to the input inductor 1122 at an electrical connection 1154, and the capacitors 1128, 1130 are electrically coupled to one another at an electrical connection 1156. The resonant inductance 1136 is shown as being electrically coupled in series between the electrical connection 1154 and the primary winding 1132 of the transformer 1006. The primary winding 1132 is further coupled to the capacitors 1128, 1130 at the electrical connection 1156.

The rectifier circuit 1008 is electrically coupled to the secondary winding 1134 of the transformer 1006 and configured to convert the second AC waveform supplied by the transformer 1006 to a DC bus waveform supplied to the power bus 302. In the illustrative embodiment, the rectifier circuit 1008 is embodied as a half-bridge rectifier formed from a plurality of diodes 1138, 1140 and includes a capacitor divider of capacitors 1142, 1144. Again, in other embodiments, other circuit topologies may be used in the rectifier circuit 1008. The rectifier circuit 1008 may also include an energy storage device, such as a bus capacitor 1146, for filtering the DC bus waveform. In particular, the secondary winding 1034 of the transformer 1006 is electrically coupled to the diodes 1138, 1040 at an electrical connection 1158 and electrically coupled to the capacitors 1142, 1144 at an electrical connection 1160. Further, the bus capacitor 1146 is electrically coupled to the diode 1138 and the capacitor 1142 at an electrical connection 1162 and is electrically coupled to the diode 1140 and the capacitor 1144 at an electrical connection 1164.

It should be appreciated that, in some embodiments, the input converter 352 may operate according to similar principles as the input converter 350. For example, in the illustrative embodiment, the input converter 352 is embodied as the half-bridge topological counterpart to the converter 350 (i.e., a full-bridge boost resonant converter). Similar to the input converter 350, the resonant operation of the input converter 352 eliminates the need for active clamping, and the output power is regulated by varying the duty cycle and maintaining a constant or near-constant frequency.

Figure 12A:
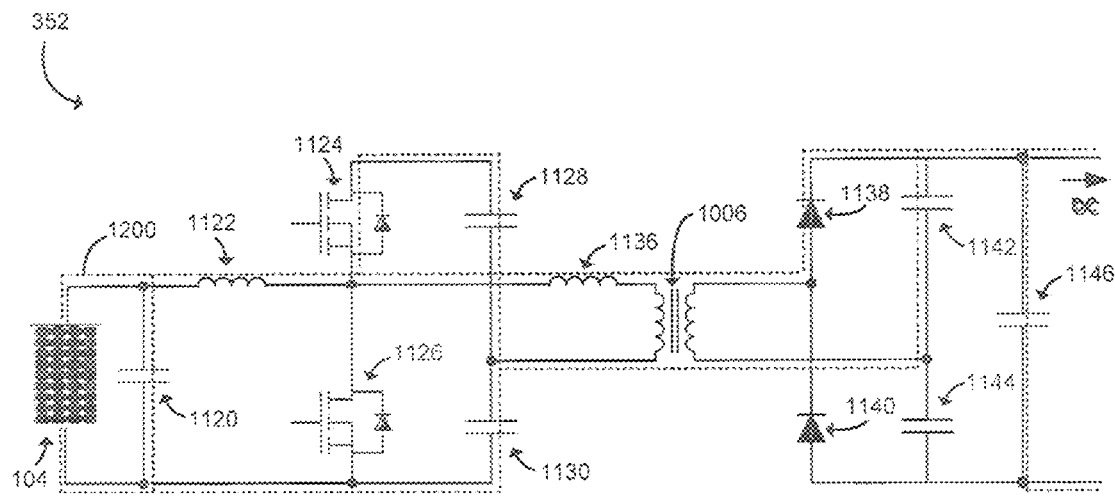
FIGS. 12A-12D illustrate operational characteristics of the input converter of FIG. 11 at various stages of operation.

Electrical schematics of the input converter 352 illustrating a flow 1200 of current through the input converter 352 at various stages of operation are shown in FIGS. 12A-12D. For ease of discussion, it should be appreciated that the input inductor 1122 is carrying a positive, nearly-constant current with low ripple. Referring now to FIG. 12A, before the switch 1124 turns on, current flows through the body diode of the switch 1124 and through the transformer 1006. It should be appreciated that a parasitic capacitance is present across the switch 1124, which prevents the voltage of the switch 1124 from instantly rising or falling (e.g., to zero); instead, there is some delay in such voltage transitions. Accordingly, the parasitic capacitance across the switch 1124 is discharged by the current flowing through the body diode of the switch 1124. When the voltage of the switch 1124 reaches zero (i.e., a low stress condition), the switch 1124 is turned on by virtue of zero voltage switching. At that point, the capacitor 1128 resonates with the resonant inductance 1136 of the transformer 1006 and with the capacitor 1142. After the transformer 1006 current resonates back to zero, the output diode 1138 prevents the continued resonation in the reverse direction.

It will be appreciated the resonant frequency, $f_1$, at this stage may be expressed according to:

$$f_1 = \frac{1}{2\pi\sqrt{L_4 \frac{n^2 C_3 (C_1 + C_2)}{C_1 + C_2 + n^2 + C_3}}}$$

where n is the turns ratio of the secondary side to the primary side of the transformer 1006, $L_4$ is the resonant inductance 1136, $C_1$ is the capacitance of the capacitor 1128, $C_2$ is the capacitance of the capacitor 1130, and $C_3$ is the capacitance of the capacitor 1138. Further, the turns ratio, n, may be expressed as $$n = \frac{n_{sec}}{n_{prim}} = \frac{V_o}{V_c},$$

where $n_{sec}$ is the number of turns of the secondary side of the transformer 1006, $n_{prim}$ is the number of turns of the primary side of the transformer 1006, $V_o$ is the output voltage of the input converter 352, and is $V_c$ the voltage across the capacitors 1128, 1130. It should further be appreciated that the relationship between the input voltage, the duty cycle of the switch 1126, and the voltage across the capacitors 1128, 1130 may be expressed as $$\frac{V_o}{V_c} = \frac{1}{1-D},$$

where D is the duty cycle.

Figure 12B:
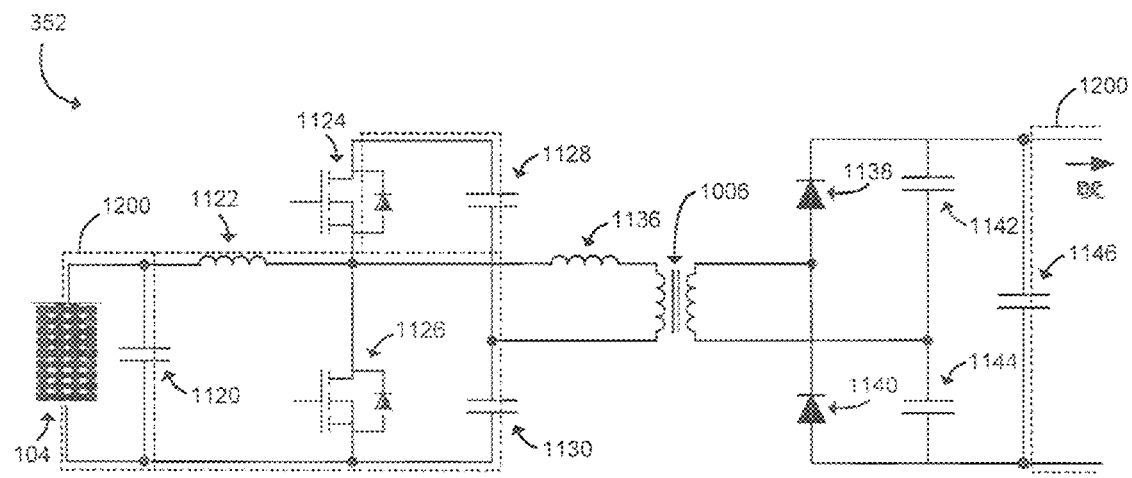
Figure 12C:
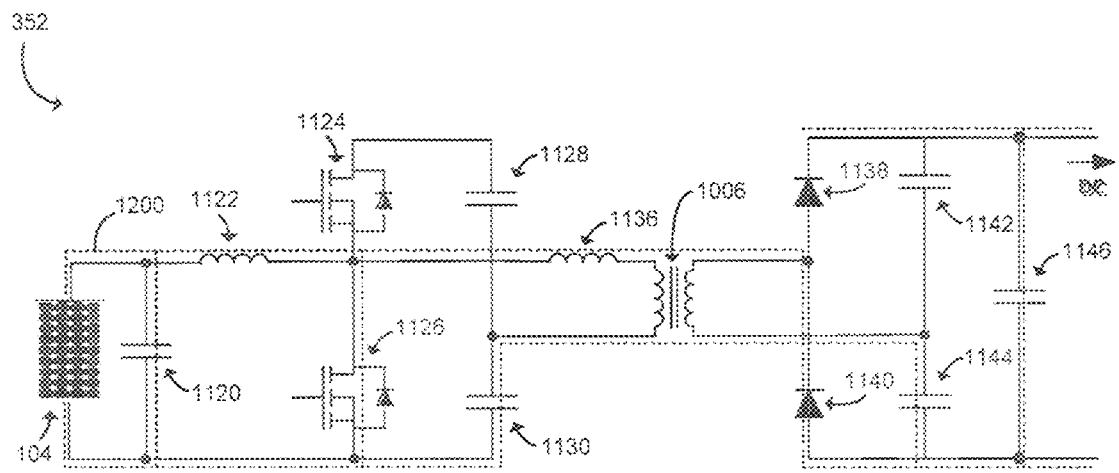

Referring now to FIG. 12B, after the switch 1124 is turned on, the current flow through the non-body diode portion (e.g., the MOSFET portion) of the switch 1124, rather than through the body diode of the switch 1124, and begins supplying energy to the capacitors 1128, 1130. It should be appreciated that there is no operational current flowing through the transformer 1006 and both of the diodes 1138, 1140 turn off at this point. The switch 1124 is then turned back off. As shown in FIG. 12C, the switch 1126 is turned on and the current of the input inductor 1122 flow through the switch 1126. By virtue of the switching from the switch 1124 to the switch 1126, resonance is excited between the resonant inductance 1136 and the capacitor 1130, which causes the transformer 1006 to conduct and the diode 1140 to turn on. The resonant frequency, $f_2$, at this stage may be expressed according to:

$$f_1 = \frac{1}{2\pi\sqrt{L_4 \frac{n^2 C_4 C_2}{C_2 + n^2 + C_4}}}$$

where $C_4$ is the capacitance of the capacitor 1144 and the other variables are similar to those described above.

Figure 12D:
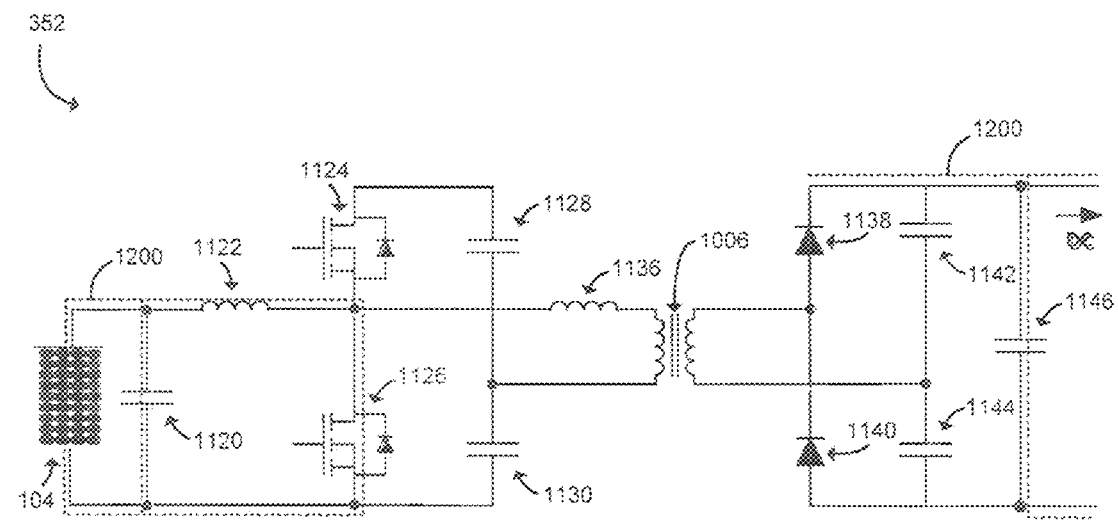

Referring now to FIG. 12D, the resonant half-cycle, which may be similar to the current 834 of FIGS. 8D and 9, has completed and the transformer 1006 therefore stops conducting. That is, the transformer 1006 current falls to zero, the switch 1126 is conducting (i.e., the non-body diode portion), and neither of the diodes 1138, 1140 are conducting. The switch 1126 then turns back off. For a brief period thereafter (i.e., a dead time), both of the switches 1124, 1126 are off, following which the input converter 352 resumes operation similar to that described above in reference to FIG. 12A. In other words, in the illustrative embodiment, FIGS. 12A-12D embody a complete cycle of operation of the input converter 352.

Figure 13A:
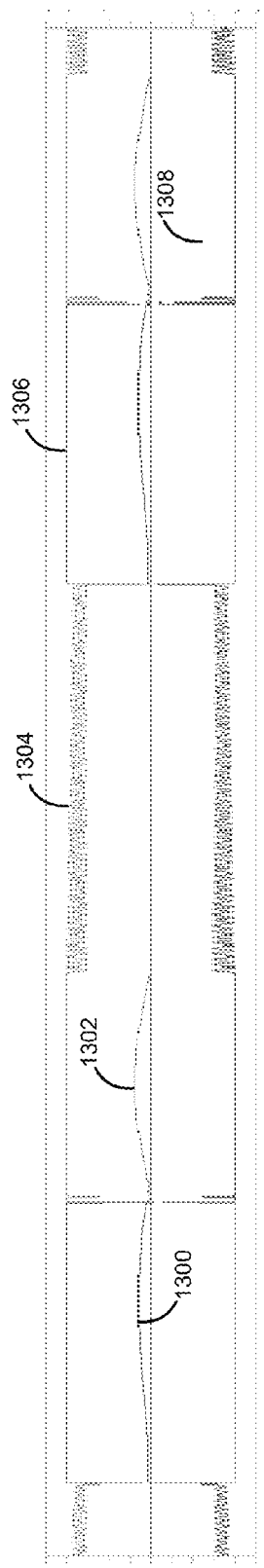
FIGS. 13A-13C illustrate simulated waveforms of various circuits of the input converter of FIG. 11.
Figure 13B:
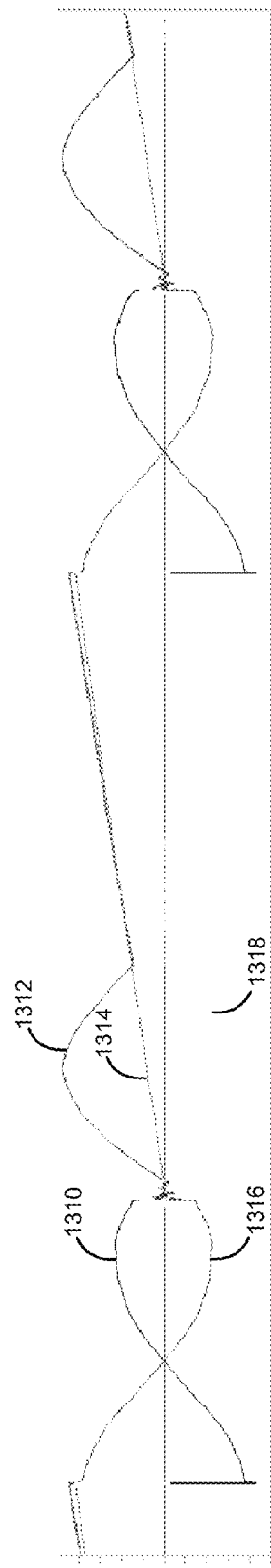
Figure 13C:
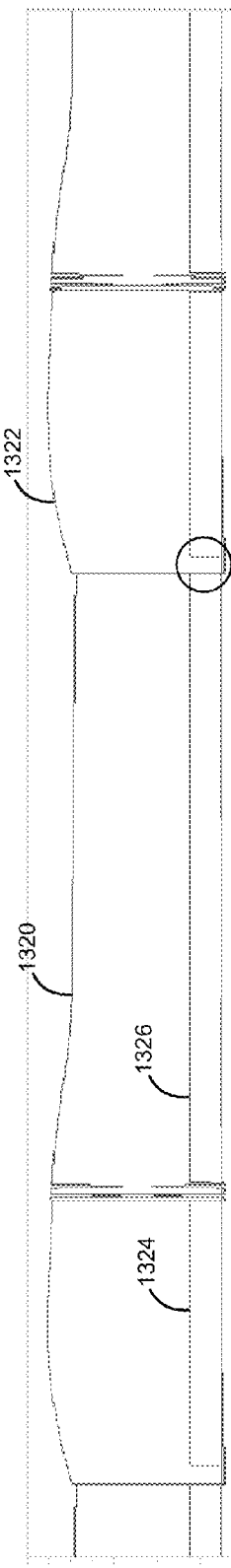

Referring now to FIGS. 13A-13C, simulated waveforms illustrating the operation of various circuits of the input converter 352 of FIG. 11. In particular, FIG. 13A illustrates a current 1300 flowing through the diode 1138, a current 1302 flowing through the diode 1140, a voltage 1304 across the diode 1138, a voltage 1306 across the diode 1140, and a voltage 1308 across the capacitor 1128 over time. FIG. 13B illustrates a current 1310 flowing through the switch 1124, a current 1312 flowing through the switch 1126, a current 1314 flowing through the input inductor 1122, a current 1316 flowing through the capacitor 1128, and a current 1318 flowing through the capacitor 1130 over time. FIG. 13C illustrates a voltage 1320 across the switch 1124 and a voltage 1322 across the switch 1126 over time. FIG. 13C also illustrates a driving signal 1324 of the switch 1124 and a driving signal 1326 of the switch 1126 over time. As shown at point 1328 and described above, the switches 1124, 1126 engage in zero-voltage switching such that the corresponding switch 1124, 1126 is turned on when the corresponding voltage 1320, 1322 is zero.

It should be appreciated that the input converter 352 may exhibit characteristics that are advantageous to a DC-to-DC boost converter in some implementations and may be similar to the benefits of the topology of the input converter 350. For example, the resonant operation of the input converter 352 may generate a relatively sinusoidal waveform across the transformer 1006, eliminate the need for an active clamping circuit, and/or permit soft switching of the output diodes 1138, 1140 (i.e., the diodes 1138, 1140 require little or no reverse recovery). Additionally, the output power may be regulated by varying the duty cycle while maintaining a constant or near-constant frequency.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An inverter for converting an input direct current (DC) waveform from a DC source to an output alternating current (AC) waveform for delivery to an AC grid, the inverter comprising:
an input converter electrically coupled to a DC power bus, wherein the input converter is configured to convert the input DC waveform to a bus waveform supplied to the DC power bus and comprises:
a full bridge resonant converter including (i) a first electrical switch and a second electrical switch electrically coupled to each other at a first electrical connection, and (ii) a third electrical switch and a fourth electrical switch electrically coupled to each other at a second electrical connection, and (iii) a resonant tank circuit electrically coupled to the first electrical connection;
a first boost converter that includes (i) a capacitor, (ii) the first electrical switch and the second electrical switch, and (iii) a first inductor having a first terminal to receive the input DC waveform and a second terminal electrically coupled to the first electrical connection; and
a second boost converter that includes (i) the capacitor, (ii) the third electrical switch and the fourth electrical switch, and (iii) a second inductor having a first terminal electrically coupled to the first terminal of the first inductor to receive the input DC waveform and a second terminal electrically coupled to the second electrical connection,
wherein the first electrical switch and the third electrical switch are electrically coupled to the capacitor at a third electrical connection; and
wherein the second electrical switch and the fourth electrical switch are electrically coupled to the capacitor at a fourth electrical connection.

2. The inverter of claim 1, wherein the capacitor comprises (i) a first terminal electrically coupled to the first electrical switch and the third electrical switch at a fifth electrical connection and (ii) a second terminal electrically coupled to the second electrical switch and the fourth electrical switch at a sixth electrical connection.

3. The inverter of claim 1, wherein the resonant tank circuit includes a resonant capacitor and a resonant inductor electrically coupled in series.

4. The inverter of claim 3, wherein the full bridge resonant converter further comprises a transformer and the resonant inductor comprises a resonant inductance formed from at least one of a leakage inductance and a magnetizing inductance of the transformer.

5. The inverter of claim 3, wherein the resonant capacitor resonates with the leakage inductance and energy is transferred from the capacitor across the transformer during resonance in response to one of (i) the first electrical switch and the third electrical switch being active or (ii) the second electrical switch and the fourth electrical switch being active.

6. The inverter of claim 1, wherein each of the first boost converter and the second boost converter is configured to increase a magnitude of the input DC waveform to generate a boosted DC waveform.

7. The inverter of claim 6, wherein:
the first and second electrical switches and the third and fourth electrical switches of the full bridge resonant converter are configured to receive the boosted DC waveform and to generate a square waveform; and
the resonant tank circuit is configured to receive the square waveform and to convert the square waveform to a resonant sinusoidal waveform.

8. The inverter of claim 1, further comprising an inverter controller electrically coupled to the input converter and configured to control operation of the first and second electrical switches and the third and fourth electrical switches.

9. The inverter of claim 8, wherein the inverter controller is configured to operate the first and second electrical switches with a phase shift relative to the third and fourth electrical switches for interleaved operation of the first and second boost converters.

10. The inverter of claim 8, wherein at least one electrical switch of the first and second electrical switches or third and fourth electrical switches is controlled by the inverter controller using zero-voltage switching.

11. The inverter of claim 8, wherein the inverter controller is configured to control operation of the first and second electrical switches and the third and fourth electrical switches using pulse width modulation and duty cycle modifications.

12. The inverter of claim 8, wherein at least one of the first boost converter and the second boost converter is configured to operate at a fixed frequency; and
wherein the corresponding electrical switches are controlled via pulse-width modulation duty cycle control.

13. The inverter of claim 1, wherein the full bridge resonant converter further comprises a transformer, and further comprising:
a rectifier circuit electrically coupled to a secondary winding of the transformer and to the DC power bus, wherein the rectifier circuit is configured to convert an input AC waveform received from the secondary winding of the transformer to the bus waveform supplied to the DC power bus.

14. The inverter of claim 1, wherein the DC source is embodied as a photovoltaic power source.

* * * * *